(12) United States Patent
Cseri et al.

(10) Patent No.: US 11,301,451 B1
(45) Date of Patent: Apr. 12, 2022

(54) DATABASE OBJECT TYPE FOR QUERYING AND TRANSACTIONAL CONSUMPTION OF CHANGES IN QUERIES RESULTS

(71) Applicant: Snowflake Inc., Bozeman, MT (US)

(72) Inventors: Istvan Cseri, Seattle, WA (US); Tyler Jones, Redwood City, CA (US); Daniel Mills, Seattle, WA (US); Daniel E. Sotolongo, Seattle, WA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/460,974

(22) Filed: Aug. 30, 2021

(51) Int. Cl.
*G06F 16/23* (2019.01)
*G06F 16/2455* (2019.01)
*G06F 16/27* (2019.01)
*G06F 16/22* (2019.01)

(52) U.S. Cl.
CPC ...... *G06F 16/2358* (2019.01); *G06F 16/2282* (2019.01); *G06F 16/2456* (2019.01); *G06F 16/24568* (2019.01); *G06F 16/278* (2019.01)

(58) Field of Classification Search
CPC ...... G06F 16/248; G06F 16/242; G06F 16/26; G06F 16/90324

USPC ......................................................... 707/625
See application file for complete search history.

(56) References Cited

U.S. PATENT DOCUMENTS

| | | | |
|---|---|---|---|
| 2004/0015783 A1* | 1/2004 | Lennon | G06F 16/242 715/235 |
| 2004/0181543 A1* | 9/2004 | Wu | G06F 16/26 |
| 2005/0060647 A1* | 3/2005 | Doan | G06F 16/248 715/205 |

* cited by examiner

*Primary Examiner* — Hung T Vy
(74) *Attorney, Agent, or Firm* — Schwegman Lundberg & Woesser, P.A.

(57) ABSTRACT

Provided herein are systems and methods for a stream object configuration, including configuring and processing streams on views. For example, a method includes detecting a first stream object on a view. The view includes a query associated with a source table. A syntax tree of the query is determined based on a definition of the view. The view is expanded based on replacing the first stream object with the syntax tree. The syntax tree includes a second stream object on the source table. Stream expansion of the second stream object is performed based on computing changes on the source table.

30 Claims, 14 Drawing Sheets

DATABASE OBJECT TYPE FOR QUERYING AND TRANSACTIONAL CONSUMPTION OF CHANGES IN QUERIES RESULTS

TECHNICAL FIELD

Embodiments of the disclosure relate generally to databases and, more specifically, to a database object type (e.g., a stream object) for querying changes in the results of queries and consuming them transactionally.

BACKGROUND

Databases are widely used for data storage and access in computing applications. A goal of database storage is to provide enormous sums of information in an organized manner so that it can be accessed, managed, updated, and shared. In a database, data may be organized into rows, columns, and tables. Different database storage systems may be used for storing different types of content, such as bibliographic, full text, numeric, and/or image content. Further, in computing, different database systems may be classified according to the organization approach of the database. There are many different types of databases, including relational databases, distributed databases, cloud databases, object-oriented and others.

Databases are used by various entities and companies for storing information that may need to be accessed or analyzed. In an example, a retail company may store a listing of all sales transactions in a database. The database may include information about when a transaction occurred, where it occurred, a total cost of the transaction, an identifier and/or description of all items that were purchased in the transaction, and so forth. The same retail company may also store, for example, employee information in that same database that might include employee names, employee contact information, employee work history, employee pay rate, and so forth. Depending on the needs of this retail company, the employee information and transactional information may be stored in different tables of the same database. The retail company may need to "query" its database when it wants to learn information that is stored in the database. This retail company may want to find data about, for example, the names of all employees working at a certain store, all employees working on a certain date, all transactions for a certain product made during a certain time frame, and so forth.

When the retail store wants to query its database to extract certain organized information from the database, a query statement is executed against the database data. The query returns certain data according to one or more query predicates that indicate what information should be returned by the query. The query extracts specific data from the database and formats that data into a readable form. The query may be written in a language that is understood by the database, such as Structured Query Language ("SQL"), so the database systems can determine what data should be located and how it should be returned. The query may request any pertinent information that is stored within the database. If the appropriate data can be found to respond to the query, the database has the potential to reveal complex trends and activities. This power can be harnessed through the use of a successfully executed query. However, the configuration of queries and consuming changes to queries may be challenging and time-consuming.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
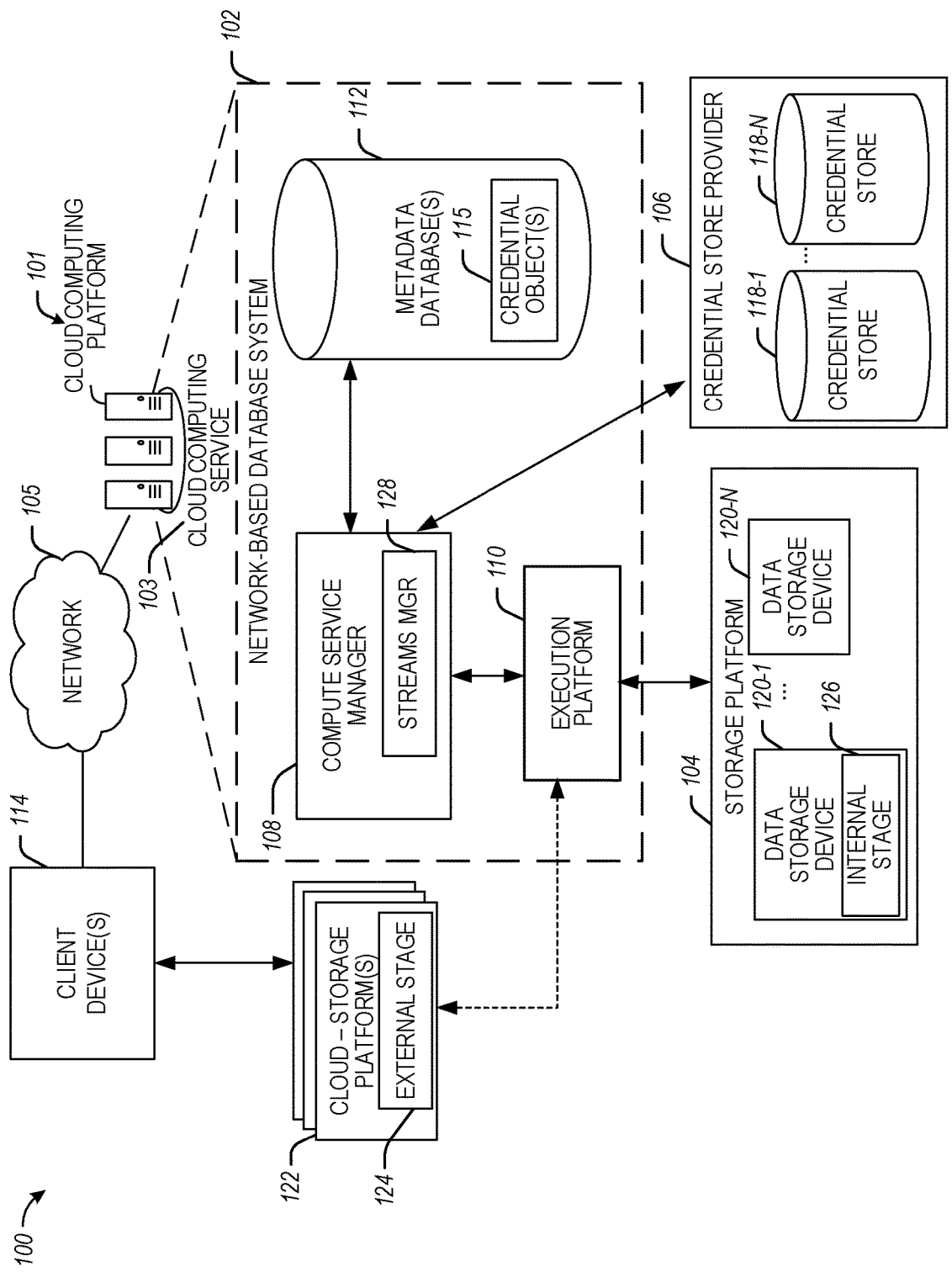
FIG. 1 illustrates an example computing environment that includes a network-based database system in communication with a cloud storage platform, in accordance with some embodiments of the present disclosure.

Reference will now be made in detail to specific example embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

In the present disclosure, physical units of data that are stored in a data platform—and that make up the content of, e.g., database tables in customer accounts—are referred to as micro-partitions. In different implementations, a data platform may store metadata in micro-partitions as well. The term "micro-partitions" is distinguished in this disclosure from the term "files," which, as used herein, refers to data units such as image files (e.g., Joint Photographic Experts Group (JPEG) files, Portable Network Graphics (PNG) files, etc.), video files (e.g., Moving Picture Experts Group (MPEG) files, MPEG-4 (MP4) files, Advanced Video Coding High Definition (AVCHD) files, etc.), Portable Document Format (PDF) files, documents that are formatted to be compatible with one or more word-processing applications, documents that are formatted to be compatible with one or more spreadsheet applications, and/or the like. If stored internal to the data platform, a given file is referred to herein as an "internal file" and may be stored in (or at, or on, etc.) what is referred to herein as an "internal storage location." If stored external to the data platform, a given file is referred to herein as an "external file" and is referred to as being stored in (or at, or on, etc.) what is referred to herein as an "external storage location." These terms are further discussed below.

Computer-readable files come in several varieties, including unstructured files, semi-structured files, and structured files. These terms may mean different things to different people. As used herein, examples of unstructured files include image files, video files, PDFs, audio files, and the like; examples of semi-structured files include JavaScript Object Notation (JSON) files, eXtensible Markup Language (XML) files, and the like; and examples of structured files include Variant Call Format (VCF) files, Keithley Data File (KDF) files, Hierarchical Data Format version 5 (HDF5) files, and the like. As known to those of skill in the relevant arts, VCF files are often used in the bioinformatics field for storing, e.g., gene-sequence variations, KDF files are often used in the semiconductor industry for storing, e.g., semiconductor-testing data, and HDF5 files are often used in industries such as the aeronautics industry, in that case for storing data such as aircraft-emissions data. Numerous other example unstructured-file types, semi-structured-file types, and structured-file types, as well as example uses thereof, could certainly be listed here as well and will be familiar to those of skill in the relevant arts. Different people of skill in the relevant arts may classify types of files differently among these categories and may use one or more different categories instead of or in addition to one or more of these.

Aspects of the present disclosure provide techniques for configuring database object types (e.g., a stream object) for querying changes in the results of queries and consuming them transactionally. For example, the disclosed techniques may be performed by a streams manager in a network-based database system. In some embodiments, the streams manager configures the processing of a stream object applied on a view. The disclosed techniques build on the concept of a stream by facilitating querying and consumption of changes to queries, rather than consumption of changes only on base tables. For example, the disclosed techniques may be used for maintaining a denormalized join for faster querying, storing the history of changes to a query for auditing, combining with data sharing to enable simple Extract, Transform, Load (ETL) across organizations.

In comparison to other query processing techniques (e.g., streams on tables and incremental ETL techniques like Slowly Changing Dimensions (SCD) joins), the disclosed techniques are associated with the following advantages: ease of use, enable incremental processing over a larger set of use cases than the other processing techniques, enables querying changes in combination with governance techniques (e.g., row-access policies, column access policies, and shared secure views). Additional advantages of the disclosed techniques include not requiring timestamp management to track the progress of query processing, using transactional stream consumption (which simplifies exactly-once processing), complex queries are automatically rewritten into a form that efficiently produces incremental changes (instead of the user having to transform the query).

The various embodiments that are described herein are described with reference where appropriate to one or more of the various figures. An example computing environment using a streams manager for configuring database object types (e.g., a stream object) for querying changes in the results of queries and consuming them transactionally is discussed in connection with FIGS. 1-3. Example configuration and functions associated with the streams manager are discussed in connection with FIGS. 4-13. A more detailed discussion of example computing devices that may be used in connection with the disclosed techniques is provided in connection with FIG. 14.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform. For example, in some aspects, the computing environment 100 may include a cloud computing platform 101 with the network-based database system 102, a storage platform 104 (also referred to as a cloud storage platform), and credential store provider 106. The cloud computing platform 101 provides computing resources and storage resources that may be acquired (purchased) or leased and configured to execute applications and store data.

The cloud computing platform 101 may host a cloud computing service 103 that facilitates storage of data on the cloud computing platform 101 (e.g., data management and access) and analysis functions (e.g. SQL queries, analysis), as well as other processing capabilities (e.g., performing reverse ETL functions described herein). The cloud computing platform 101 may include a three-tier architecture: data storage (e.g., storage platforms 104 and 122), an execution platform 110 (e.g., providing query processing), and a compute service manager 108 providing cloud services.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/ or files of one or more other types—on, as examples, one or more of their servers and/or on one or more cloud-storage platforms such as AMAZON WEB SERVICES™ (AWS™), MICROSOFT® AZURE®, GOOGLE CLOUD PLAT- FORM™, and/or the like. The customer's servers and cloud-storage platforms are both examples of what a given customer could use as what is referred to herein as an external storage location. The cloud computing platform 101 could also use a cloud-storage platform as what is referred to herein as an internal storage location concerning the data platform.

From the perspective of the network-based database system 102 of the cloud computing platform 101, one or more files that are stored at one or more storage locations are referred to herein as being organized into one or more of what is referred to herein as either "internal stages" or "external stages." Internal stages are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 101 is in communication with the cloud storage platforms 104 and 122 (e.g., AWS®, Microsoft Azure Blob Storage®, or Google Cloud Storage), and a cloud credential store provider 106. The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end-users providing data storage and retrieval requests, system administrators managing the systems and methods described herein, and other components/devices that interact with compute service manager 108.

In some embodiments, the compute service manager 108 comprises a streams manager 128 for configuring database object types (e.g., a stream object) for querying changes in the results of queries and consuming them transactionally. A more detailed description of the streams manager 128 and the functions it may perform is provided in connection with FIGS. 2 and 4-13.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108. Client device 114 (also referred to as user device 114) may include one or more of a laptop computer, a desktop computer, a mobile phone (e.g., a smartphone), a tablet computer, a cloud-hosted computer, cloud-hosted serverless processes, or other computing processes or devices may be used to access services provided by the cloud computing platform 101 (e.g., cloud computing service 103) by way of a network 105, such as the Internet or a private network.

In the description below, actions are ascribed to users, particularly consumers and providers. Such actions shall be understood to be performed concerning client device (or devices) 114 operated by such users. For example, notification to a user may be understood to be a notification transmitted to client device 114, input or instruction from a user may be understood to be received by way of the client device 114, and interaction with an interface by a user shall be understood to be interaction with the interface on the client device 114. In addition, database operations (joining, aggregating, analysis, etc.) ascribed to a user (consumer or provider) shall be understood to include performing such actions by the cloud computing service 103 in response to an instruction from that user.

The compute service manager 108 is also coupled to one or more metadata databases 112 that store metadata about various functions and aspects associated with the network-based database system 102 and its users. For example, a metadata database 112 may include a summary of data stored in remote data storage systems as well as data available from a local cache. Additionally, a metadata database 112 may include information regarding how data is organized in remote data storage systems (e.g., the cloud storage platform 104) and the local caches. Information stored by a metadata database 112 allows systems and services to determine whether a piece of data needs to be accessed without loading or accessing the actual data from a storage device.

As another example, a metadata database 112 can store one or more credential objects 115. In general, a credential object 115 indicates one or more security credentials to be retrieved from a remote credential store. For example, the credential store provider 106 maintains multiple remote credential stores 118-1 to 118-N. Each of the remote credential stores 118-1 to 118-N may be associated with a user account and may be used to store security credentials associated with the user account. A credential object 115 can indicate one or more security credentials to be retrieved by the compute service manager 108 from one of the remote credential stores 118-1 to 118-N (e.g., for use in accessing data stored by the storage platform 104).

The compute service manager 108 is further coupled to the execution platform 110, which provides multiple computing resources (e.g., execution nodes) that execute, for example, various data storage, data retrieval, and data processing tasks. The execution platform 110 is coupled to storage platform 104 and cloud storage platforms 122. The storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some embodiments, at least one internal stage 126 may reside on one or more of the data storage devices 120-1-120-N, and at least one external stage 124 may reside on one or more of the cloud storage platforms 122.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata database(s) 112, execution platform 110, and storage platform 104, are shown in FIG. 1 as individual discrete components. However, each of the compute service manager 108, metadata database(s) 112, execution platform 110, and storage platform 104 may be implemented as a distributed system (e.g., distributed across multiple systems/platforms at multiple geographic locations). Additionally, each of the compute service manager 108, metadata database(s) 112, execution platform 110, and storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the cloud computing platform 101 of the computing environment 100 separates the execution platform 110 from the storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
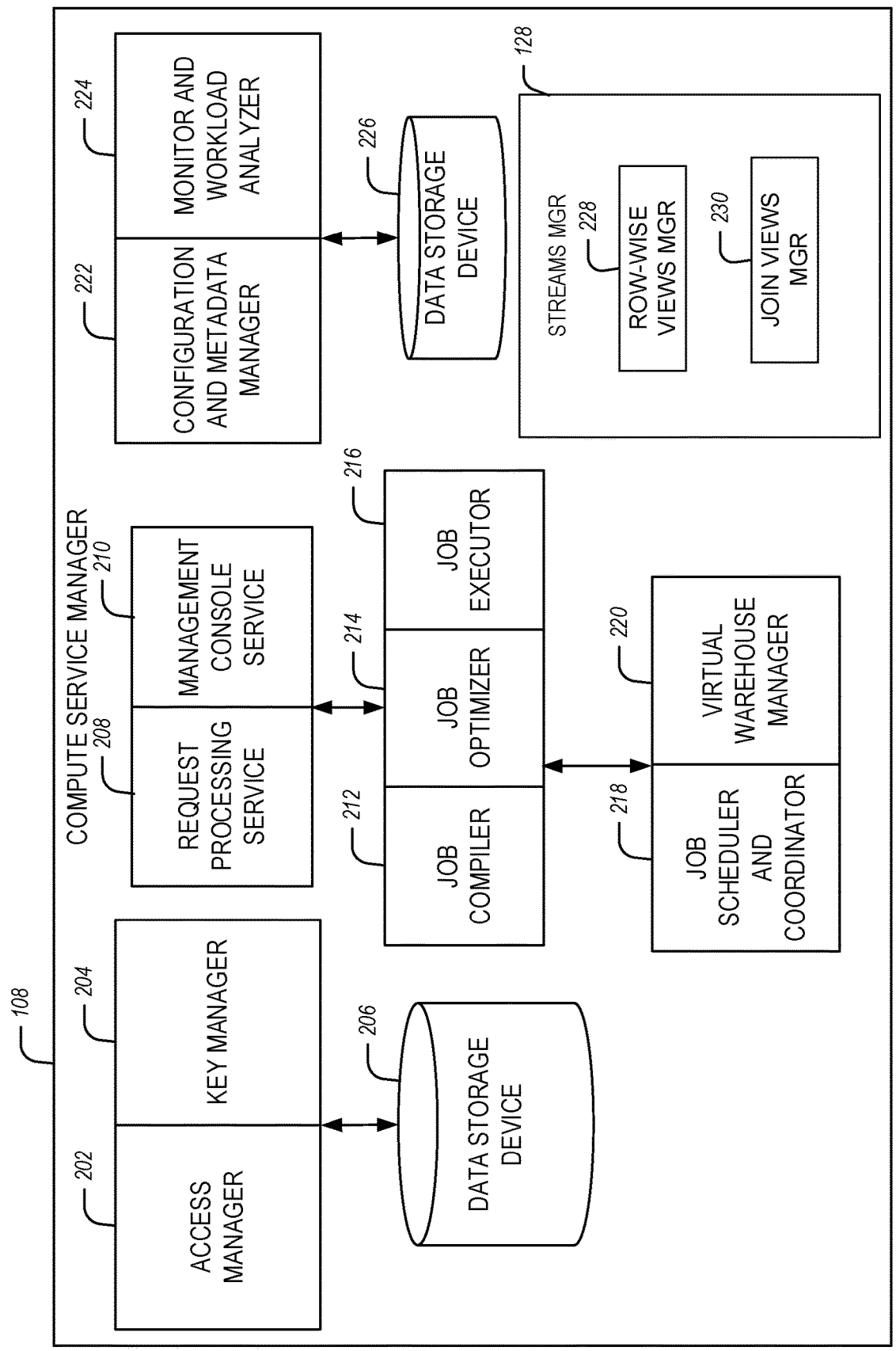
FIG. 2 is a block diagram illustrating the components of a compute service manager using a streams manager, in accordance with some embodiments of the present disclosure.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to an access metadata database 206, which is an example of the metadata database(s) 112. Access manager 202 handles authentication and authorization tasks for the systems described herein. The credential management system 204 facilitates the use of remotely stored credentials (e.g., credentials stored in one of the remote credential stores 118-1 to 118-N) to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store (e.g., one or more of the remote credential stores 118-1 to 118-N) and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. Job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries.

Additionally, the compute service manager 108 includes a configuration and metadata manager 222, which manages the information related to the data stored in the remote data storage devices and the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. The data storage device 226 in FIG. 2 represents any data storage device within the network-based database system 102. For example, data storage device 226 may represent buffers in execution platform 110, storage devices in storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1 may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

In some embodiments, the compute service manager 108 further includes the streams manager 128 for configuring database object types (e.g., a stream object) for querying changes in the results of queries and consuming them transactionally. The streams manager 128 may comprise a row-wise views manager 228 configured to perform the functionalities discussed herein related to row-wise views configuration and processing. The streams manager 128 may also comprise a join views manager 230 configured to perform the functionalities discussed herein related to join views configuration and processing.

In some embodiments, the row-wise views manager 228 is configured to support change queries on (secure) views containing row-wise operators (e.g., select, project, and union all). In some aspects, the limitation on operators may allow for the delivery of data processing features to users. In some embodiments, the join views manager 230 is configured to handle join operations (or joins) in change queries (e.g., over slowly-changing dimensions). This initial algebra associated with this functionality may be extended to cover updates, outer joins, and higher-arity joins. The implementation of this functionality may also involve significant query rewriting functionality.

Figure 3:
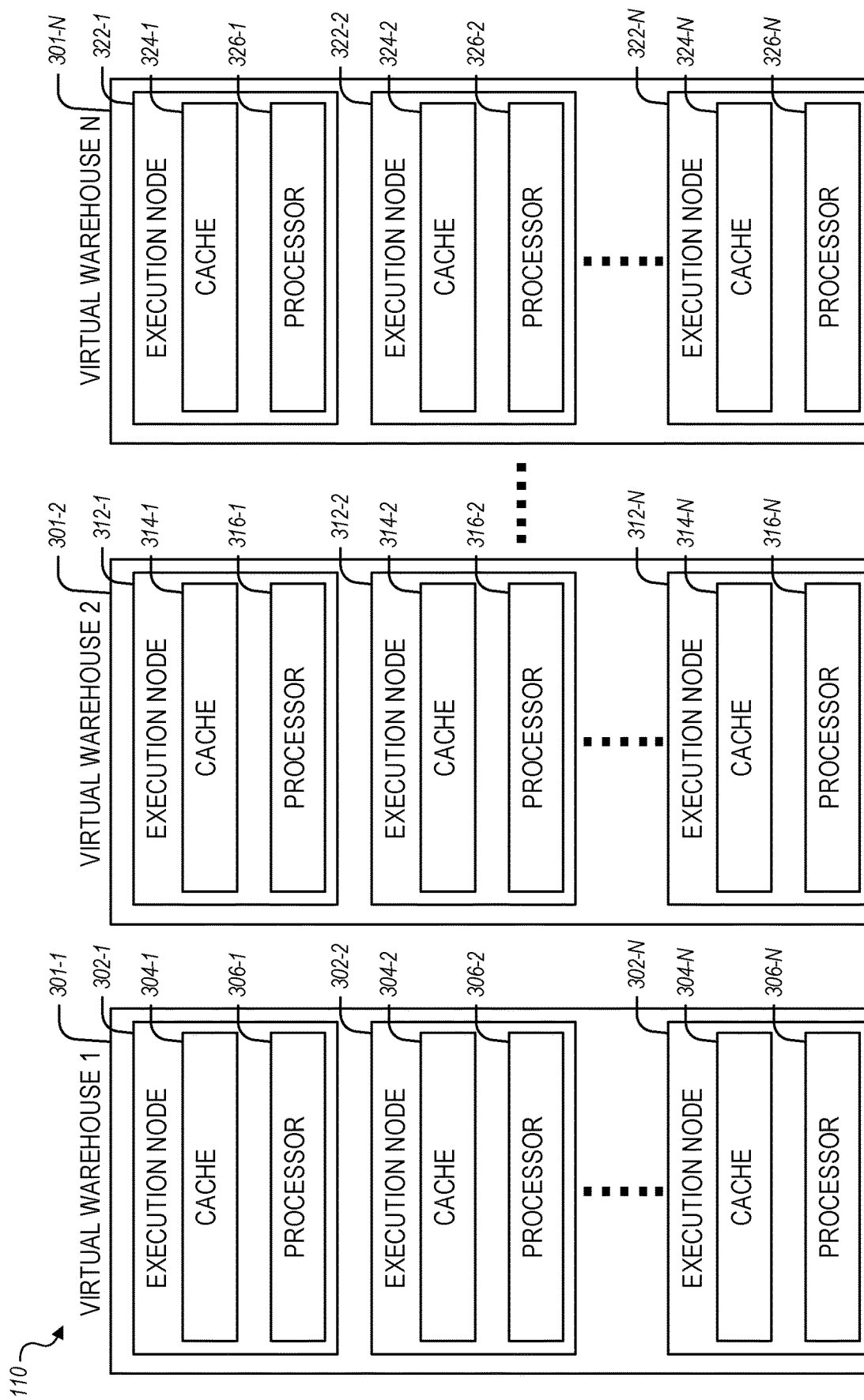
FIG. 3 is a block diagram illustrating components of an execution platform, in accordance with some embodiments of the present disclosure.

FIG. 3 is a block diagram illustrating components of the execution platform 110, in accordance with some embodiments of the present disclosure. As shown in FIG. 3, the execution platform 110 includes multiple virtual warehouses, including virtual warehouse 1 (or 301-1), virtual warehouse 2 (or 301-2), and virtual warehouse N (or 301-N). Each virtual warehouse includes multiple execution nodes that each include a data cache and a processor. The virtual warehouses can execute multiple tasks in parallel by using multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in the cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer necessary.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternative embodiments may include execution nodes containing any number of processors and any number of caches. Additionally, the caches may vary in size among the different execution nodes. The caches shown in FIG. 3 store, in the local execution node, data that was retrieved from one or more data storage devices in the cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, virtual warehouses 1, N may be implemented using multiple computing systems at multiple geographic locations. For example, virtual warehouse 1 can be implemented by a computing system at a first geographic location, while virtual warehouses 2 and n are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location, and execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault-tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer necessary.

In some embodiments, the virtual warehouses may operate on the same data in the cloud storage platform 104, but each virtual warehouse has its execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance observed by the existing users.

As used herein, the term "table" indicates a mutable bag of rows, supporting time travel up to a retention period.

As used herein, the term "view" indicates a named SELECT statement, conceptually similar to a table. In some aspects, a view can be secure, which prevents queries from getting information on the underlying data obliquely.

As used herein, the term "materialized view" indicates a view that is eagerly computed rather than lazily (e.g., as a standard view). In some aspects, efficient implementation of materialized views has overlap with change tracking functionality.

As used herein, the term "CHANGES clause" indicates a syntactic modifier on a FROM clause indicating that a SELECT statement should return the changes that occurred to the specified table between two given times (docs). In some aspects, several different change types can be requested:

(a) The default type (also referred to as delta) finds the smallest set of changes that could account for the difference between the tables at the given times;

(b) The append-only type only finds rows that were appended to the table; and (c) The audit type (currently not public) computes all changes made between the given times, even if they cancel out.

Figure 4:
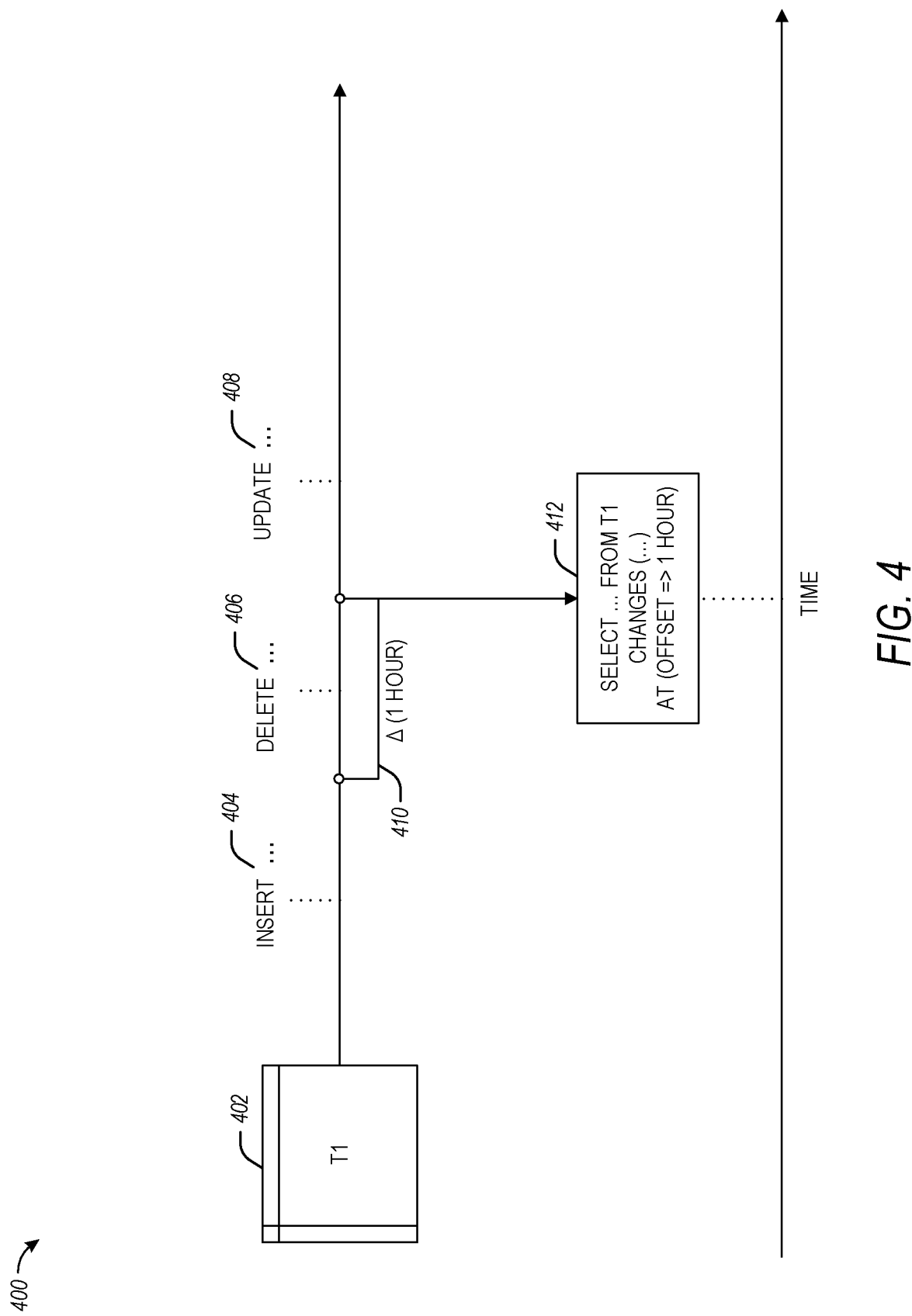
FIG. 4 is a diagram of using a CHANGES clause in connection with query processing, in accordance with some embodiments of the present disclosure.

FIG. 4 is diagram 400 of using a CHANGES clause in connection with query processing, in accordance with some embodiments of the present disclosure. Referring to FIG. 4, queries or data processing commands Insert 404, Delete 406, and Update 408 are applied to source table 402. As illustrated in FIG. 4, the SELECT statement 412 may be used for returning the changes that occurred to the source table 402 during period 410 (e.g., one hour).

As used herein, the term "stream" refers to a table and a timestamp. In some aspects, a stream may be used to iterate over changes to a table. When a stream is read inside a Data Manipulation Language (DML) statement, its timestamp may be transactionally advanced to the greater timestamp of its time interval (docs). In some aspects associated with join operations (or joins), the term "stream" may refer to a mapping of tables to timestamps.

Figure 5:
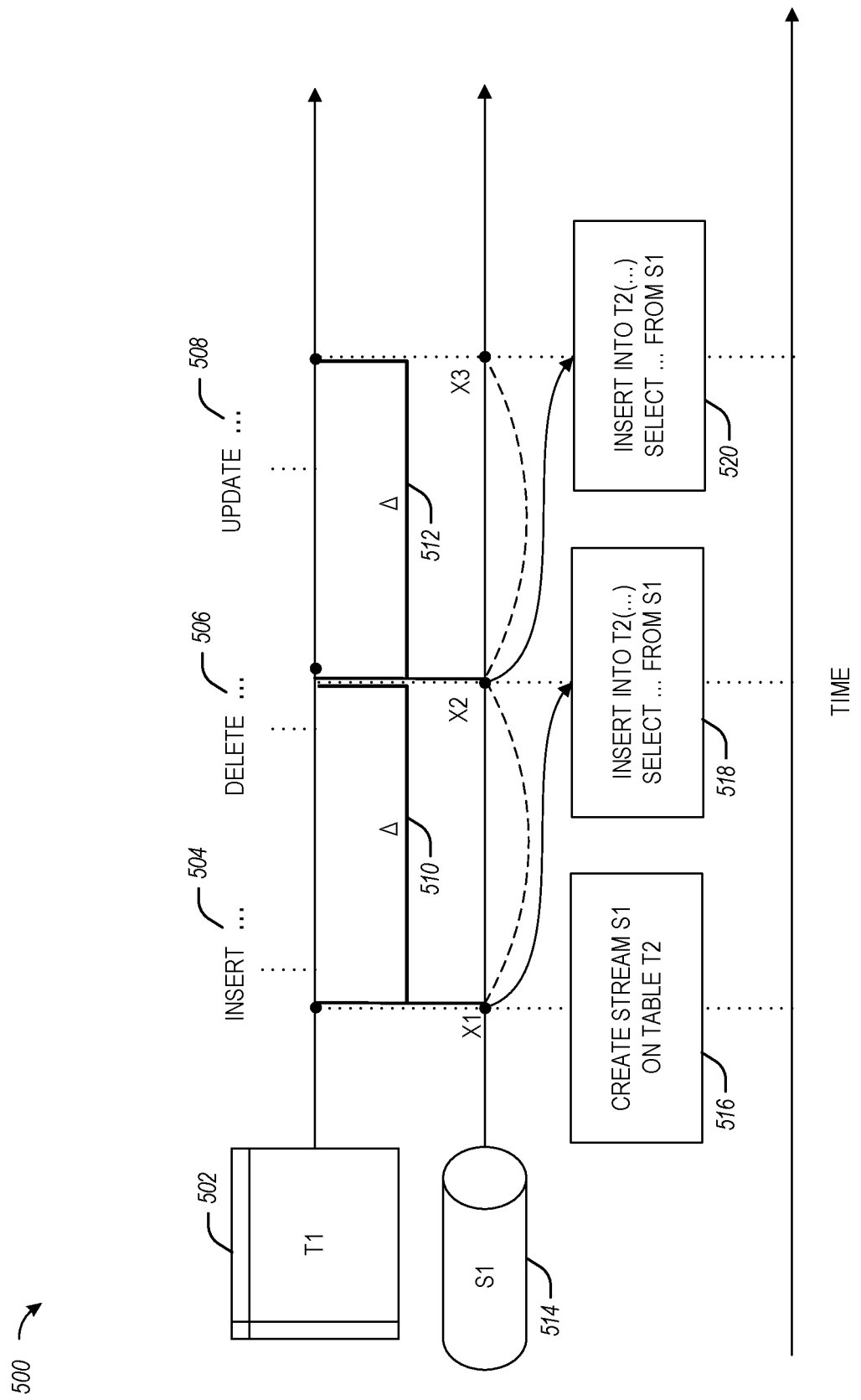
FIG. 5 is a diagram of a stream object configuration for a table, in accordance with some embodiments of the present disclosure.

FIG. 5 is diagram 500 of a stream object configuration for a table, in accordance with some embodiments of the present disclosure. Referring to FIG. 5, queries or data processing commands Insert 504, Delete 506, and Update 508 are applied to source table 502. As illustrated in FIG. 5, a stream S14 is generated on source table T1 502 at times X1, X2 (after a time interval 510 from X1), and X3 (after a time interval of 512 from X2). Additionally, at operation 516, stream S1 is created on table T2. At operation 518, a stream entry from stream S1 at time X1 is inserted into table T2. At operation 520, a stream entry from stream S1 at time X2 is inserted into table T2.

As used herein, the term "access control" indicates that customers can control who can access database objects within their organization (docs).

As used herein, the term "data sharing" indicates customers can grant access to database objects to other organizations (docs).

In some aspects, any query with a CHANGES clause or a stream may be referred to as a change query. A change query on a view may be defined similarly.

In some embodiments, the streams manager 128 is configured to provide changes to views (e.g., a stream on views) so that the changes may be further processed and acted on. More specifically, the streams manager 128 may be configured to provide or process streams on views in connection with the following three use cases: shared views, complex views, and view evolution. In some aspects, more than one use case may apply at a given time.

Shared (secure) views may be used to provide (e.g., a user or organization) limited access to sensitive data. The consumer of the data often wishes to observe changes to the data being shared with them. Some considerations implied by this use case include giving the consumer visibility into the shared view's retention period and how to enforce secure view limitations on change queries.

Figure 6:
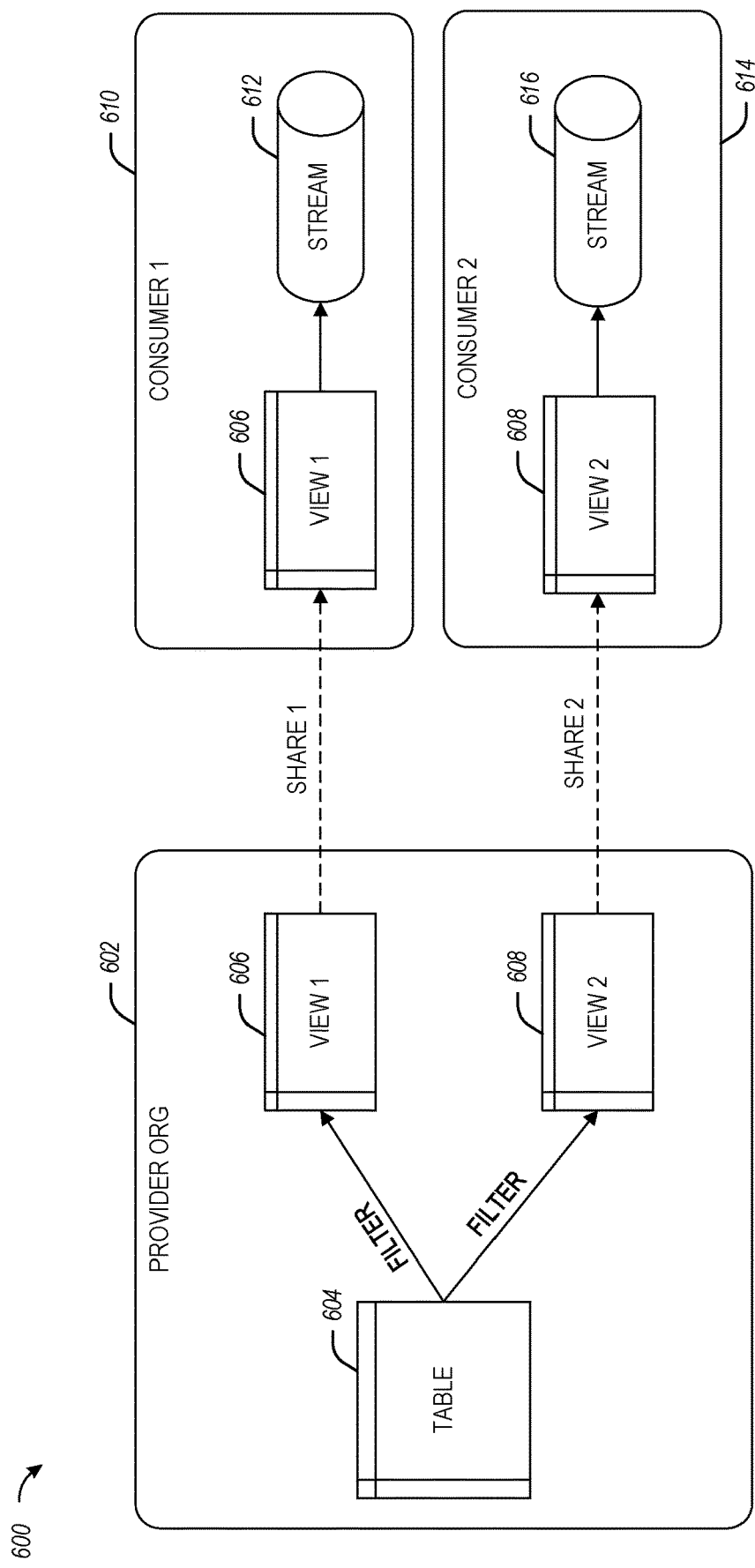
FIG. 6 is a diagram of shared views, in accordance with some embodiments of the present disclosure.

FIG. 6 is a diagram 600 of shared views, in accordance with some embodiments of the present disclosure. Referring to FIG. 6, a data provider 602 manages a source table 604. The data provider 602 applies different filters to source table 604 to generate views 606 and 608. View 606 is shared with consumer 610, and view 608 is shared with consumer 614. In some embodiments, the streams manager 128 is used for configuring streams 612 and 616 on corresponding views 606 and 608 for consumption by consumers 610 and 614.

The definition of a view can be quite complex, but observing the changes to such a view may be useful independently of its complexity. Manually constructing a query to compute those changes may be achieved, but can be toilsome, error-prone, and suffer from performance issues. In some aspects, a change query on a view may automatically rewrite the view query, relieving users of this burden. In some aspects, simple views containing only row-wise operators (e.g., select, project, union all) may be used. In some aspects, complex views that join fact tables with (potentially several) slowly-changing-dimension (DIM) tables may also be used. Other kinds of operators like aggregates, windowing functions, and recursion may also be used in connection with complex views.

Figure 7:
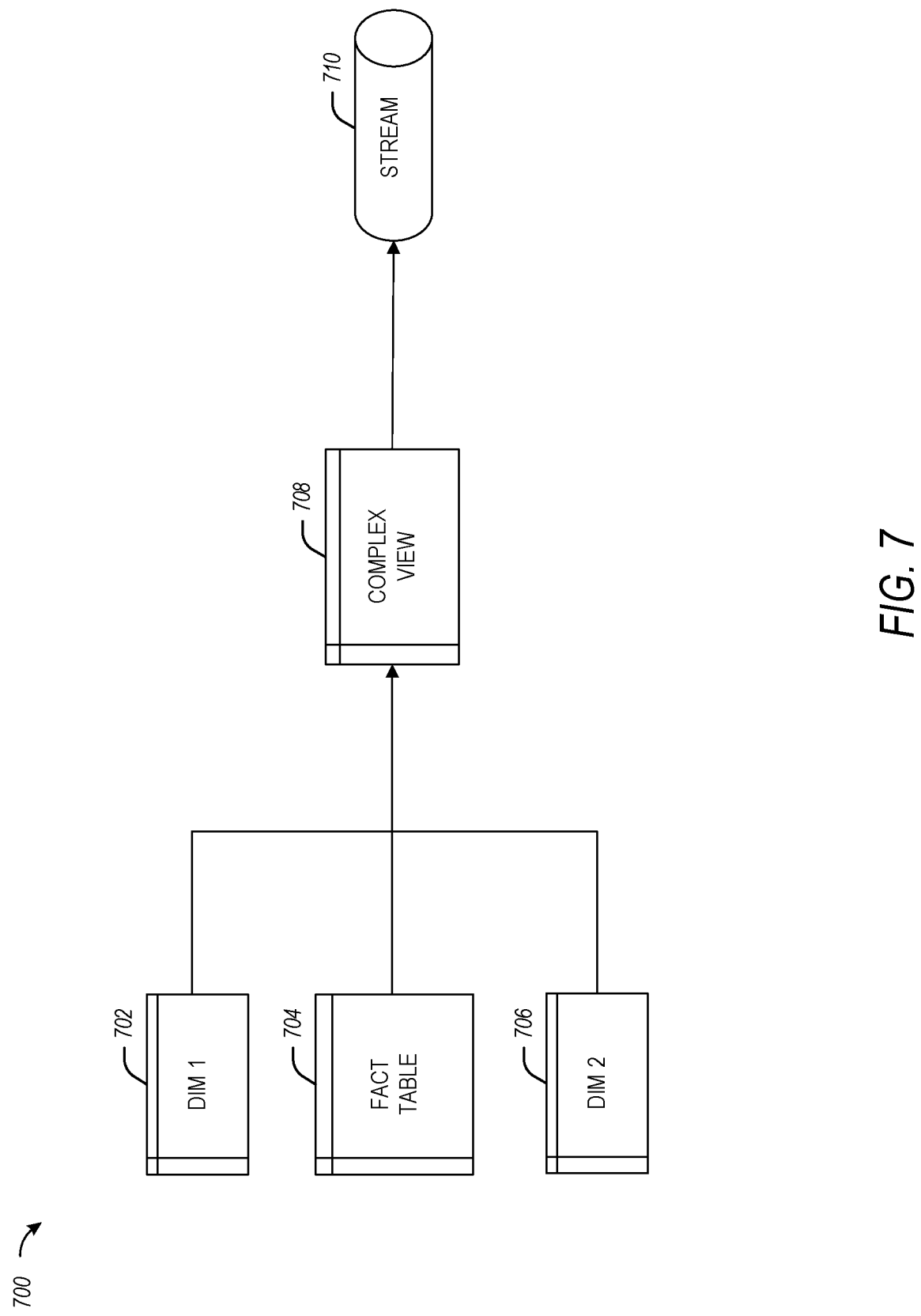
FIG. 7 is a diagram of a stream object based on a complex view, in accordance with some embodiments of the present disclosure.

FIG. 7 is a diagram 700 of a stream object based on a complex view, in accordance with some embodiments of the present disclosure. Referring to FIG. 7, a complex view 708 may be generated based on source tables 702, 704, and 706. In some embodiments, the streams manager 128 configures a stream 710 based on the complex view 708 of source tables 702, 704, and 706.

In some aspects, views may be used to create an abstraction boundary, where the underlying tables can be modified without consumers being aware. For example, a view over a table undergoing a backward-incompatible schema change may be replaced by a new query that presents the same data in a different query, causing a view evolution. In some aspects, change queries may work across view redefinition, allowing change observation to the view uninterrupted by modifications to its definition. Considerations for this use case may include schema compatibility and performance. Some view redefinitions may use full joins to resolve, and others, such as workflows involving table clones, could be resolved more efficiently.

Figure 8:
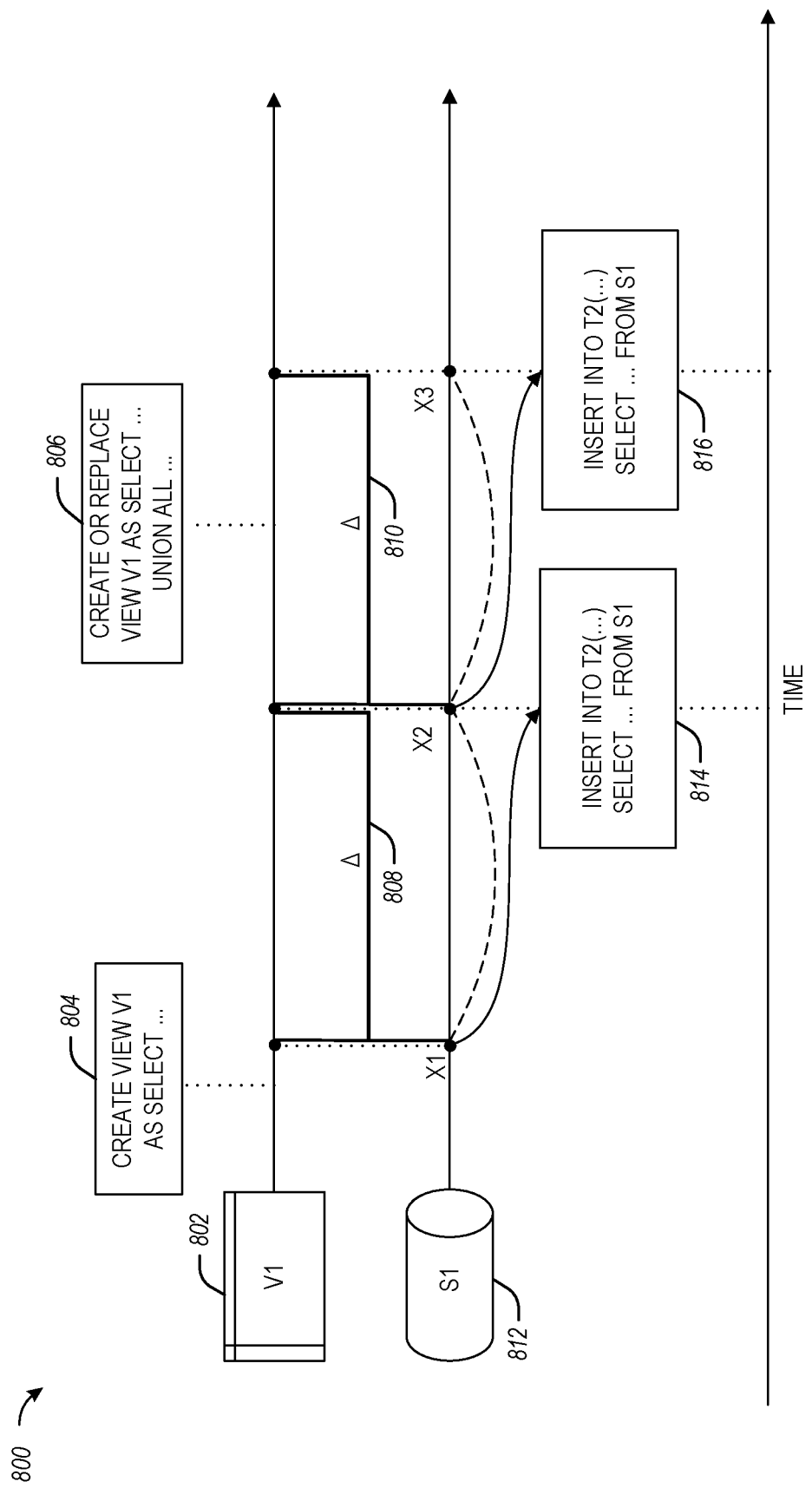
FIG. 8 is a diagram of a view evolution, in accordance with some embodiments of the present disclosure.

FIG. 8 is a diagram 800 of a view evolution, in accordance with some embodiments of the present disclosure. Referring to FIG. 8, at operation 804, view V1 802 is created based on a Select operation. Stream S1 812 of view V1 802 is generated at times X1, X2 (after a time interval 808 from X1), and X3 (after a time interval of 810 from X2). Additionally, at operation 814, a stream entry from stream S1 at time X2 is inserted into table T2. Before time X3, view V1 802 evolves at operation 806, when a union all operation is used. At operation 816, a stream entry from stream S1 (based on the evolved view V1 at time X3) is inserted into table T2.

In some embodiments, to provide or process streams on views in connection with the above-listed use cases, the streams manager 128 may be configured with the following functionalities: intuitive semantics, unsurprising security, linear cost scaling, and easy operability.

In some aspects associated with intuitive semantics, change queries on views may work intuitively and consistently. The essence of a change query is to take a time-varying object and a time interval, then return a set of changes that explain the differences in the object over the interval. This definition applies naturally to views, but there are some additional configurations addressed below.

As not all operations may be supported by the streams manager 128, property on views may be configured which explicitly allows change queries on it: CHANGE_TRACKING=true. When a view is created with this property enabled, a validation is performed that it only contains supported operators and the base tables have change tracking enabled. When a change query is issued on a view, it may succeed if the view has change tracking enabled.

In some aspects, a standing change query (e.g., a stream) may exhibit reference semantics. That is, when a user specifies a view in a change query, such specification may be interpreted as referring to the view itself, not what the view is currently defined as. Adopting value semantics would likely result in surprising behavior, especially around access management.

Adopting reference semantics is associated with the ways a view can be modified. The following techniques may be used for view modifications:

(a) "ALTER VIEW . . . RENAME TO . . . " When a view is renamed, objects referencing it may be updated. Complying with this precedent means a stream should break if its view is renamed.

(b) "ALTER VIEW . . . SET SECURE . . . " If a view is made secure, subsequent change queries to it should enforce secure view constraints.

(c) "CREATE OR REPLACE VIEW . . . " If a view is replaced, there are processing choices. Per the View Evolution use case, some users may want the view to keep working as long as the replacement is schema compatible. However, this may add complexity to the implementation.

In some aspects associated with unsurprising security, a consumer of a change query on a view may have the same access they have to the view itself. The following configurations may apply to all views: creating a stream on a view fails if the underlying tables do not have change tracking enabled, and the creator does not have permission to enable it; consumers can see the minimum retention period of the tables referenced by a view (they cannot see which table the retention applies to); and if change tracking was enabled on a table in a view more recently than the beginning of the retention period, consumers can see when it was enabled.

In some aspects, the following configurations may be applied to secure views: consumers cannot see the view's definition; consumers cannot issue a change query to before access was granted to the view; optimizations abide by secure view limitations (they do not reorder operators into the expanded view), and the retention period on a table in a secure view is not extended automatically to prevent a consuming stream from going stale.

In some aspects associated with linear cost scaling, a key attribute of change queries on tables is that their cost (both in terms of latency and credits) may be proportional to the result size. Append-only change queries may be introduced to work around cases when this scaling does not hold for delta queries. In some aspects, change queries on views may scale similarly in cost. That is, delta change queries and append-only change queries may scale proportionally to the result size.

In some aspects associated with easy operability, introducing change queries on views may increase the likely distance between the view provider and consumer (the shared views use case may revolve around this). The distance makes collaboration between provider and consumer more difficult. In turn, this means that a smooth operational experience for change queries on views is more important than for traditional change queries. In some aspects, the following operational challenges may be addressed by the streams manager 128: handling view modification and surface errors.

In some aspects associated with the handling of view modifications, if the view provider renames or replaces their view, a stream on it will break. The consumer will then want to take action to repair it. The details of such repairs are use case-specific but it may involve trying to recreate the stream with a new definition, and resuming where the broken stream let off. To support this, the streams manager 128 may be configured to support statements of the following form: CREATE OR REPLACE STREAM s . . . AT (STREAM=>s). The stream S is being both queried and replaced.

In some aspects associated with surface errors, a view consumers may try to issue changes queries that are invalid for various reasons. The errors may be surfaced clearly to the consumer. Examples of such errors include: the underlying tables may not have change tracking enabled; the change query may be outside of the tables' retention period; the change query may contain unsupported operators; and the view may have been modified, breaking the change query.

View providers may have control over what happens to a view and any objects derived from it. However, they would benefit from visibility into how the view is being used to avoid accidentally breaking consumers. Examples of such notices include: when the provider tries to make a breaking modification to a view, warn the provider that consumers will be disrupted; when consumers' change queries fail due to retention or change tracking, send the provider a notification; and support some introspection as well, such as a view provider looking up the number of streams consuming it and their offsets.

Streams on Views—General Configurations for the Streams Manager 128

A stream object on tables (including external tables) may be configured to let the user retrieve a stream of changesets as the underlying data in the table changes. A stream object is configured to maintain a position in this list of changesets and that is only advanced if it is used in a DML statement. Reading from the stream may return the changeset from the current position up to the current transaction timestamp. As the underlying data changes the size of the changeset will grow until the stream is advanced. In some aspects, the advance may be transactional.

In some embodiments, the streams manager 128 is configured to create and process stream objects on views, in particular for data sharing scenarios. In some aspects, shared data consumers may be able to get the latest changes from the shared data provider. Given that exposing shared data is done through secure views, a stream may be created on the consumer side on the view from the provider. In some aspects, streams on materialized views may also be configured to allow retrieving changesets as the underlying materialized view (MV) changes.

In some embodiments, providing changesets on a view (e.g., a query) is similar to the incremental materialized view maintenance problem. In the case of MVs as the underlying data source(s) change, the materialized data set may be updated incrementally. In some aspects, this processing may be performed at the micro-partition level to create a query plan which uses the data from the added/deleted partitions and merges it with the MV data to produce the updated data.

In the case of a stream object (or stream) on a view, the changeset returned may be the delta of the data the view would return at the current transactional time compared to the data of the view would return at the transactional time of the position of the stream. In some aspects, computing the delta efficiently may be a consideration since there may be no materialized data set that can be leveraged and incrementally updated. In some aspects, a materialized view may be created behind the scenes to mitigate this with the limitations of the queries MVs support today which can make sense, especially for aggregate queries.

In some aspects, the delta for certain classes of queries may be generated efficiently (e.g., if there is only one data source). In that case, the data source of the view can be logically replaced with the delta provided by the stream on the data source. In some embodiments, the streams manager 128 may support projections and filters in the view as well. For example, data processing operators may be allowed where applying the operators on the delta provides the same result as computing the delta on the datasets at the two end points. In the initial solution when the stream is created on a view, support for the view is validated, the data source table is located, and change tracking is set up for the table. When the data is requested from the stream, the underlying view in the query plan is expanded, and the data source table is replaced with generating the delta (similar to the processing applied if a stream on that table is configured in the first place). This processing may also be supported for secure views as well since the data source inside is swapped and no outside filters would get pushed in.

In addition to maintaining the position of the start point of the change set, the stream may also implicitly expand the retention period on the underlying table up to two weeks depending on how far in the past of the table version history the stream position points. Such processing may also be performed for non-remote data sources. For shared data sources, the same mechanism may not be used because the table compaction status data on the remote side would need to be updated. In this regard, streams on shared data sources can go stale after a day which is the default retention period for tables. To mitigate this effect, the provider of the shared data can increase the retention period on the table to allow more time for the stream on the provider side to be consumed (and advanced).

Figure 9:
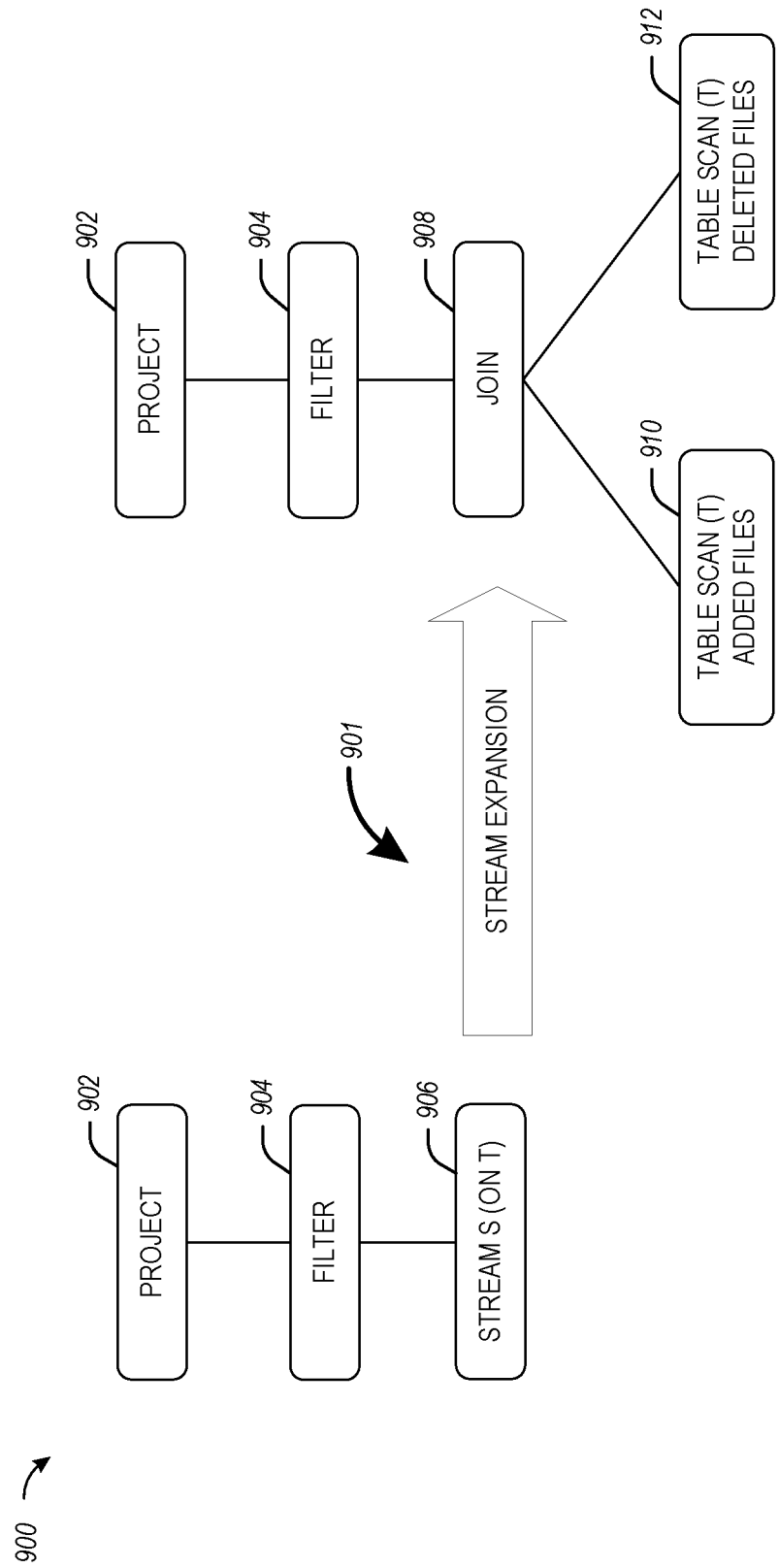
FIG. 9 is a diagram of a stream expansion, in accordance with some embodiments of the present disclosure.

FIG. 9 is a diagram 900 of a stream expansion performed by the streams manager 128, in accordance with some embodiments of the present disclosure. Referring to FIG. 9, a query may include a project operation 902 and a filter operation 904 applied on a source table T. At operation 906, a stream S is generated (e.g., by the streams manager 128) on source (base) table T. As illustrated in FIG. 9, stream expansion 901 is performed on stream S to replace the stream S with a join operation 908, where the join operation 908 is applied between table scan operations 910 and 912. Table scan operation 910 may be based on scanning the source table T for added files, and table scan operation 912 may be based on scanning the source table T for deleted files.

In some embodiments associated with stream expansion, the stream delta changes are computed by considering the added and deleted files (micro-partitions) in the base table T of the stream S and joining the rows from these tables on the logical row id. In some aspects, the logical row ID is maintained by the change tracking system during example DML, operations. As illustrated in FIG. 9, the stream expansion 901 will generate the join operation 908 (and possibly other operations which are not illustrated in FIG. 9 for simplicity) and will produce inserted and deleted rows based on the delta information. If a row is updated in the base table T, there will be a deleted and inserted row generated with a special row id in these to allow matching these up. The following is an example of a high-level query plan for a query that may be used in connection with FIG. 9: CREATE STREAM S ON TABLE T; and SELECT C1, C2 FROM S WHERE C3>2.

Figure 10:
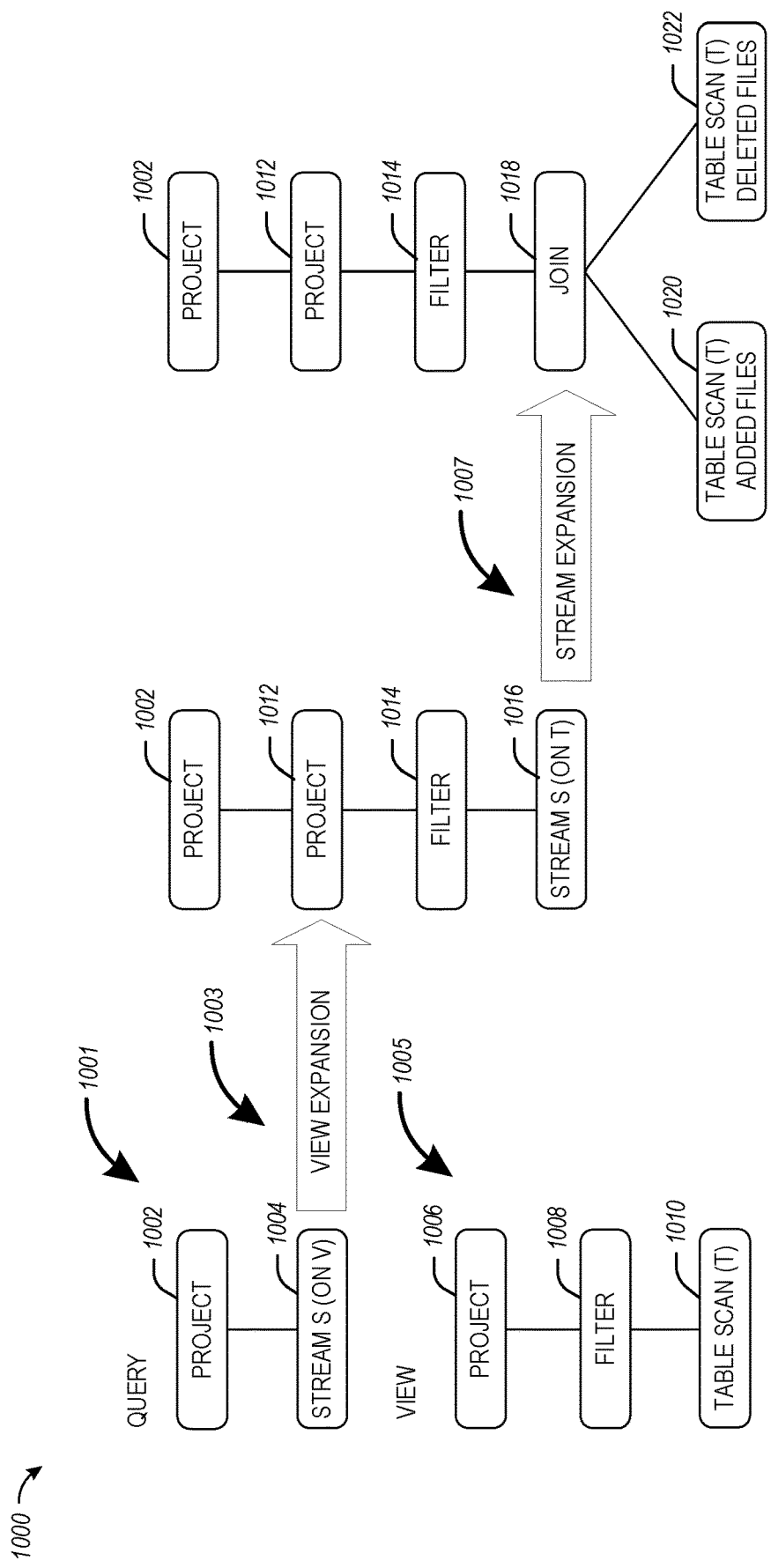
FIG. 10 is a diagram of a view expansion and a stream expansion in connection with a single source table, in accordance with some embodiments of the present disclosure.

FIG. 10 is a diagram 1000 of a view expansion and a stream expansion performed by the streams manager 128 in connection with a single source table, in accordance with some embodiments of the present disclosure. Referring to FIG. 10, the streams manager 128 may process a query 1001 including a project operation 1002 and stream S 1004 on a view. The view can include an example view 1005 based on a project operation 1006, a filter operation 1008, and a table scan operation 1010 on a source (base) table T.

The streams manager 128 may perform a view expansion operation 1003 and include a project operation 1012, a filter operation 1014, and a stream S 1016 on the base table T in place of the stream S 1004 on the view. The streams manager 128 may perform a stream expansion operation 1007 to replace stream S 1016 with a join operation 1018. The join operation 1018 may be applied between table scan operations 1020 and 1022. Table scan operation 1020 may be based on scanning the source table T for added files, and table scan operation 1022 may be based on scanning the source table T for deleted files.

In some embodiments, to produce a stream changeset on a view with one table source, the streams manager 128 can replace the table source with the changeset according to the stream offset during the view expansion. The following is an example of a high-level query plan for a query that may be used in connection with FIG. 10: CREATE VIEW V AS SELECT C1, C2 FROM T WHERE C3>2; CREATE STREAM S ON VIEW V; and SELECT C1 FROM S.

Figure 11:
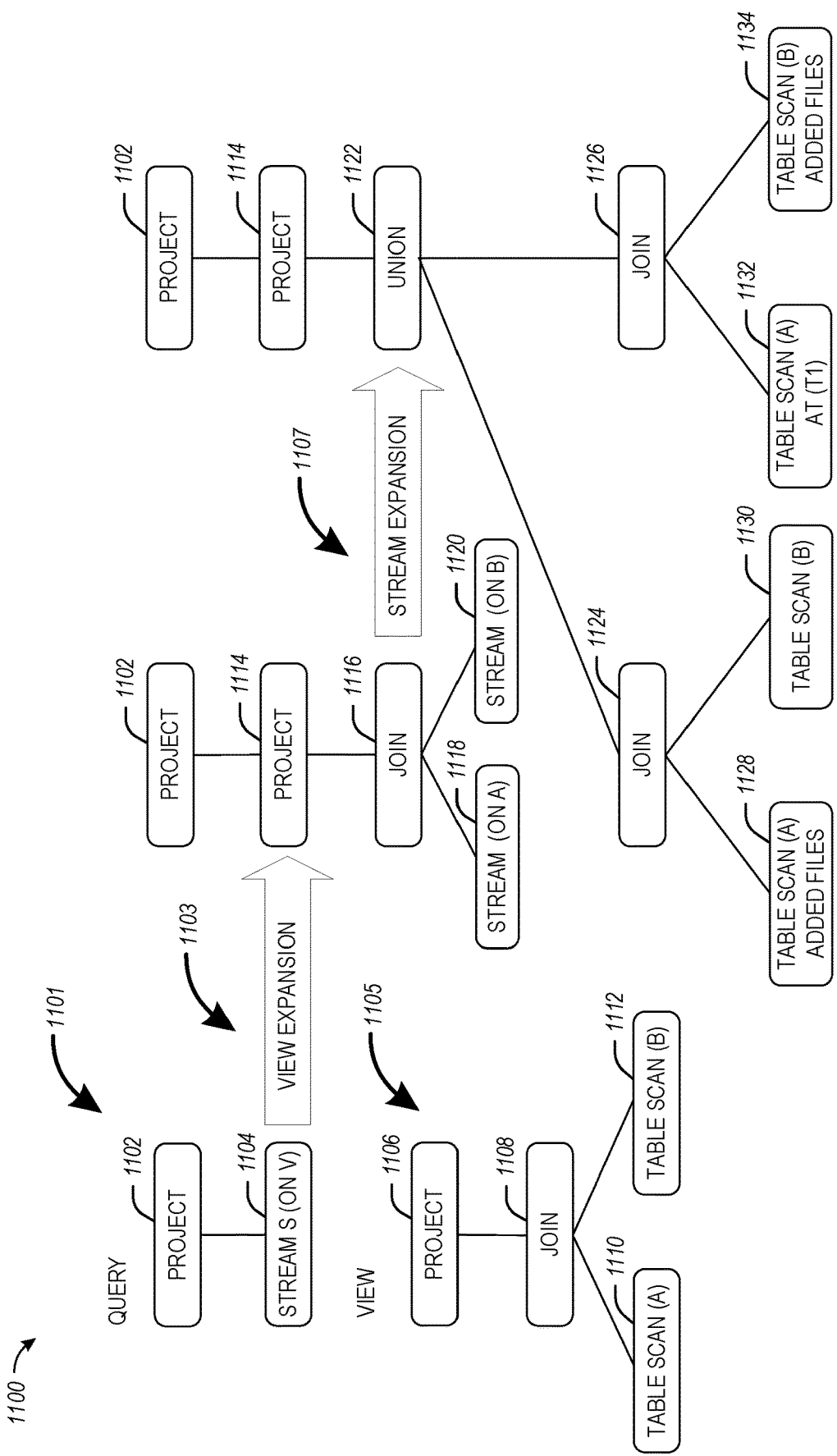
FIG. 11 is a diagram of a view expansion and a stream expansion in connection with multiple source tables, in accordance with some embodiments of the present disclosure.

In some aspects associated with data sharing scenarios and handling views with at least two table inner joins, the streams manager 128 may use a table to restrict what rows are visible in a shared table. This type of processing may be done using secure views so that a user can only retrieve a specific dataset out of the table. In this case, the table source may not be replaced with a stream since both tables might have changed since the last time the stream was consumed. In this regard, the streams manager 128 may generate the changeset for a join of two tables by composing a union of joining the previous table data with the deltas and also joining the deltas themselves (e.g., as illustrated in FIG. 11). In some aspects, insert only changes may be considered. In this case, the notation of $A[T1]$ is the table dataset at a transactional time, and $\Delta A[T1-T2]$ is the changeset between T1 and T2. The following processing illustrated in Table 1 may be performed by the streams manager 128:

TABLE 1

1. $A2 = A1 \cup \Delta A$;
2. $B2 = B1 \cup \Delta B$;
3. $A2 \bowtie B2 = (A1 \cup \Delta A) \bowtie (B1 \cup \Delta B) = (A1 \bowtie B1) \cup (A1 \bowtie \Delta B) \cup (B1 \bowtie \Delta A) \cup (\Delta A \bowtie \Delta B)$;
4. $\Delta(A2 \bowtie B2) = (A1 \bowtie \Delta B) \cup (B1 \bowtie \Delta A) \cup (\Delta A \bowtie \Delta B) = (A1 \bowtie \Delta B) \cup (B2 \bowtie \Delta A) = (A2 \bowtie \Delta B) \cup (B1 \bowtie \Delta A) =$ In some aspects, the following processing illustrated in Table 2 may be performed by the streams manager 128 to delete only changes:

TABLE 2

1. $A[T2] = A[T1] - \Delta A[T1 - T2]$
2. $B[T2] = B[T1] - \Delta B[T1, T2]$
3. $A[T2] \bowtie B[T2] = (A[T1] - \Delta A[T1 - T2]) \bowtie (B[T1] - \Delta B[T1, T2]) = (A[T1] \bowtie B1[T1]) - (A[T1] \bowtie \Delta B[T1, T2]) - (B[T1] \bowtie \Delta A[T1, T2]) - (\Delta A[T1, T2] \bowtie \Delta B[T1, T2])$
4. $\Delta (A[T2] \bowtie B[T2])[T1, T2] = (A[T1] \bowtie \Delta B[T1, T2]) \cup (B[T1] \bowtie \Delta A[T1, T2]) \cup (\Delta A[T1, T2] \bowtie \Delta B[T1, T2]) = (A[T1] \bowtie \Delta B[T1, T2]) \cup (B[T2] \bowtie \Delta A[T1, T2]) = (A[T2] \bowtie \Delta B[T1, T2]) \cup (B[T1] \bowtie \Delta A[T1, T2])=$ In some aspects, the view and stream expansion may be changed by replacing the table sources with the appropriate changeset where applicable, and the join may be replaced with a union of two joins.

FIG. 11 is a diagram 1100 of a view expansion and a stream expansion performed by the streams manager 128 in connection with multiple source tables, in accordance with some embodiments of the present disclosure. Referring to FIG. 11, the streams manager 128 may process a query 1101 including a project operation 1102 and stream S 1104 on a view V. The view V can include an example view 1105 based on a project operation 1106 and a join operation 1108. The join operation 1108 is associated with a table scan operation 1110 for a source table A and a table scan operation 1112 for a source table B.

The streams manager 128 may perform a view expansion 1103 and include a project operation 1114 and a join operation 1116 in place of the stream S 1104. The join operation 1116 is associated with a stream 1118 on source table A and stream 1120 on source table B.

The streams manager 128 may perform a stream expansion 1107 to replace the join operation 1116 with a union operation 1122. The union operation 1122 may be performed on join operations 1124 and 1126. The join operation 1124 may be performed on table scan operations 1128 and 1130, and join operation 1126 may be performed on table scan operations 1132 and 1134.

Example Configurations of the Row-Wise Views Manager 228

In some embodiments associated with example syntax, a new property on views may be configured for the row-wise views manager 228 to enable change-tracking features based on the following syntax in Table 3:

TABLE 3

CREATE [ OR REPLACE ] SECURE VIEW <name>
CHANGE_TRACKING=true
AS <select>

In some embodiments, a new syntax to create streams on change-tracking views may be configured for the row-wise views manager 228 based on the following syntax in Table 4:

TABLE 4

CREATE [ OR REPLACE ] STREAM [IF NOT EXISTS]
    <name>
      [ COPY GRANTS ]
      [ COMMENT = '<string_literal>' ]
      ON { TABLE <table_name> | VIEW <view_name> }
      [ APPEND_ONLY = TRUE | FALSE ]
      [ { AT | BEFORE } { TIMESTAMP => <timestamp>
            | OFFSET => <time_difference>
      | STATEMENT => <id> } ]

In some embodiments, a CHANGES clause can be applied by the row-wise views manager 228 to change-tracking views, using the following syntax: SELECT . . . FROM <view> CHANGES . . . .

In some embodiments, new columns in the output of SHOW STREAMS can be applied by the row-wise views manager 228, based on the following syntax in Table 5:

TABLE 5 source_domain = { TABLE | STREAM | . . . }
source_name: name of table, stream, etc. the stream reads from.
Contains the name of the view whose DML updates are tracked by the stream.

In some embodiments associated with supported views, the row-wise views manager 228 may support views containing the following operations:

(a) Filter: "SELECT . . . WHERE <predicate>".
(b) Project: "SELECT c1, c2, . . . FROM v".
(c) Deterministic scalar functions. The following functions may be explicitly disallowed: context functions like CURRENT_TIME (semi-deterministic context functions like CURRENT_SCHEMA may be supported) and system functions like SYSTEM$EXPLAIN_PLAN_JSON (SYSTEM$TYPEOF may be supported).
(d) UNION ALL. This operation may be useful for materialization workflows. In some aspects, queries on secure views may block optimizations from moving operators outside of the view into the view.

In some embodiments associated with altering view operations, the row-wise views manager 228 is configured to support altering views as follows.

(a) RENAME TO <new_name>. This operation may be used for changing the user-visible name of the view, but not its ID. The stream may continue working as if nothing changed. Future SHOW STREAMS queries may show the new view name.
(b) {SET|UNSET} SECURE. This operation may be used for changing the view to be {secure|not-secure}. Future reads from the stream will {apply not apply} secure constraints to the query.
(c) {SET|UNSET} COMMENT. This operation may be used for associating a string with the view.

In some aspects associated with a stream on view creation, the row-wise views manager 228 can be configured for processing the following syntax formats:

(a) allow the VIEW keyword;
(b) handle the VIEW table kind in SqlParser::generateParseTreeCreateDDL. The view may be expanded and validated at create time. This can be done in one of the following ways:
(b.1) use SqlObjectRef:setDontExpandView and let the validator visit the parse tree;
(b.2) manually fetch the view definition and use Statement.compile to validate it;
(b.3) both of these methods may include notifying the SqlValidator visitor that it is working within a change query, which can be configured with a boolean field SqlValidator::inChangeQuery. The source table(s) for the view may be extracted using a DefaultSqlNodeVisitor. Using these table(s), processing can tie into the existing code that checks whether change tracking is enabled on them (and try to enable it or fail) and looks up and stores the most recent table versions from the current stream state. For secure views, the row-wise views manager 228 may check that the stream's initial offset is not before the time the view was shared.

In aspects associated with the CHANGES clause, the row-wise views manager 228 may be configured to handle this query type in SqlObjectNameResolver::visitPost(Sql-From), from which Stream::expandImplementation is invoked. The expansion may be guarded by a check that the FROM reference is a physical table. In some embodiments, this guard may be relaxed to allow views.

In some embodiments associated with Show and Describe, the following two columns may be added to SHOW STREAMS in ExecShow: source_kind is the domain of the stream's source (table or view) and source_name is the name of that source. In some aspects, a row containing the source's retention time may be added.

In some embodiments associated with stream expansion, the row-wise views manager 228 may be configured with extended Stream::expandImplementation to expand the view using SqlObjectNameResolver::expandViewDefinition. Once the view is expanded, the processing code may proceed normally into expandGeneratedViewText, where a stream is expanded. The table stream expansion may be configured with immediate access to the leaf table. In the view stream case, the row-wise views manager 228 may traverse the view and perform stream expansion on each leaf table. Because of the algebraic properties of row-wise views, performing the current stream expansion on the interior of the view may be used as well.

The row-wise views manager 228 may be configured to distinguish between the source table, which is the view targeted by the change query, and the offset table(s), which are the leaf tables inside of the expanded view. The following several exceptions may be handled by the row-wise views manager 228 during query expansion: (a) if the stream's source view is replaced, the table lookup will return null just as with a table; and (b) if the stream's source tables are beyond their retention time, the expanded change query will fail during stream expansion when fetching EP files.

In some embodiments associated with query validation, query validation may be performed by the row-wise views manager 228 using an SqlValidator tree visitor. The validation may run over a fully expanded tree. In some aspects, the validation may be modeled on materialized view validation and reuse the same utilities. In some aspects, the same checks may not be reused. In some aspects, the validation logic may be refactored.

In some embodiments, view stream validation may be enabled if the visitor is traversing a descendant of either of the following:

(a) a SqlCreateStream node, which indicates the tree being traversed is the stream's source. To inform the visitor of this context, we add a boolean field to SqlValidator, similarly to SqlValidator::inMaterializedViewCreation.

(b) a SqlFrom node on a stream or with a changes clause. The queryBlocks deque may be inspected to determine if the current node has a from-with-changes node as an ancestor. In some embodiments, this information may be materialized in the QueryBlockVisitState for performance.

In some embodiments, when a visitor is in a change query context, the following constraints may be checked:

(a) In visit(SqlObjectRef): for example, based on no built-in views, materialized views, table functions, etc.).

(b) In visit(SqlQueryBlock): for example, based on no window functions; no distinct; no group by; no limit; no order by; FROM clause has a single, physical source table or . . . , a join tree with only UNION ALL, no CHANGES clauses.

(c) In visit(SqlSessionVariableRef), error.

(d) In visitPre(SqlFunction): only deterministic functions and no aggregate functions.

In some embodiments associated with offset generalization, a stream's offset may be stored as a pair of table IDs and a timestamp. This configuration may work for single-table views but may be generalized to handle multi-table views.

In some embodiments, a class Frontier is introduced to represent a stream's progress abstractly. This class may have the following subtypes: TableFrontier (for table streams, the frontier is a single table and timestamp), ViewFrontier (for view streams, the frontier is a map from table ids to timestamps, containing exactly the tables in the expanded view), and <external source>Frontier. An extensible frontier type may facilitate extending streams to cover such use cases.

In some embodiments, Frontier may be encoded using one or more of JavaScript Object Notation (JSON), a simple binary format consisting of an array of pairs of integers, and into a binary format using another encoding.

For storage, the STREAM_OFFSET, STREAM_ADVANCE, and STREAM_TABLE_ID values may be migrated to a single string containing an encoded frontier. Specifically:

(a.1) In STREAM_STATE_SLICE, deprecate STREAM_OFFSET and STREAM_TABLE_ID, and add CURRENT_FRONTIER.

(a.2) In TXN_STREAM_STATE_SLICE, deprecate STREAM_OFFSET, STREAM_ADVANCE, and TABLE_VERSIONS_COUNT, and add CURRENT_FRONTIER and NEXT FRONTIER.

(a.3) In CHANGELOG_SLICE, deprecate STREAM_OFFSET and STREAM_TABLE_ID, and add CURRENT_FRONTIER.

Example Configurations of the Join Views Manager 230

In some embodiments associated with multi-table stream state, the join views manager 230 may be configured to stores a stream's offset in 3 fields: table ID, offset, and watermark. This model may be used for single-table views but may be generalized to represent multiple offsets.

A class Frontier may be introduced to represent a stream's progress abstractly. In some aspects, this class may have a single subtype TableFrontier. For streams on regular tables, external tables, directory tables, and views, the frontier is a map from table IDs to an offset and watermark, containing the tables in the expanded view. In some aspects, an extensible frontier type may facilitate extending streams.

In some aspects associated with frontier advance, when a stream is queried, a new offset may be computed referring to the base table's latest version before the given END( ) time (or the current time if not provided). The new offset may be referred to as the stream's advance. This calculation may be generalized to compute an advanced frontier across all base tables.

In some embodiments, Frontier may be encoded using one or more of JavaScript Object Notation (JSON), a simple binary format consisting of an array of pairs of integers, and into a binary format using another encoding.

For storage, the STREAM_OFFSET, STREAM_ADVANCE, and STREAM_TABLE_ID values may be migrated to a single string containing an encoded frontier. Specifically:

(a.1) In STREAM_STATE_SLICE, add CURRENT_FRONTIER and deprecate STREAM_OFFSET, STREAM_WATERMARK, and STREAM_TABLE_ID.

(a.2) In TXN_STREAM_STATE_SLICE, add CURRENT_FRONTIER and NEXT_FRONTIER, and deprecate STREAM_OFFSET, STREAM_WATERMARK, STREAM_ADVANCE, STREAM_ADVANCE_WATERMARK, and TABLE_VERSIONS_COUNT.

(a.3) In CHANGELOG_SLICE, add CURRENT_FRONTIER and deprecate STREAM_OFFSET, STREAM_WATERMARK, and STREAM_TABLE_ID.

In some aspects associated with stream DDL, DML, and system functions, when creating a stream on a single-table view, the view may be expanded and its base table ID may be extracted. With multi-table views, all such table IDs may be found and stored. For user-provided initial offsets, a Stream state may be created with an initial offset stored in the StreamDPO, which may be replaced by a frontier.

In some embodiments, single-object clones may be configured to resolve the current frontier instead of the base table's current version. For schema and database clones, the source view and base tables may need to be resolved using the mapping from old to new in case any of them were cloned.

In some embodiments, the SHOW and DESCRIBE STREAM commands have columns indicating whether the stream is currently stale and when it will become stale. This calculation may be updated to find the minimum stale time across all base tables.

In some embodiments, the STREAM_HAS_DATA system function returns true whenever the stream's base table has unconsumed table versions. This function may be generalized to return true when any of the base tables have unconsumed table versions.

Stream refresh occurs during calls to STREAM_HAS_DATA, a process that moves up the stream's offset and watermark when the stream is empty. This process may be generalized to refresh a frontier over multiple base tables. Because views can filter a large fraction of the data in a table, but STREAM_HAS_DATA only checks whether any tables have changed, checking whether a stream on a view has data is more prone to false positives than streams on tables. In some embodiments, query pruning on the whole stream query may be used to reduce the false-positive rate.

In some embodiments, the STREAM_GET_TABLE_TIMESTAMP system function fetches a stream's current offset as a timestamp. For streams with multiple base tables, this function may return an error.

In aspects associated with Get_DDL( ), the DDL that defines a stream may be independent of the definition of the view that defines it.

In aspects associated with DML, and transactions, interactions between streams and join views manager 230 may be unaffected because the stream state encapsulates implementation details. However, changes may be made to the code in StreamStateDAO that stores the uncommitted stream state in the stream's transaction workspace. This may support storing frontiers as well as (table id, offset, advance). Furthermore, stream retention extension may be generalized to EpFileCompactStatus::setStreamOldestTableVersionToKeep for each base table in the stream.

In aspect associated with multi-table change queries, streams may be expanded into a change query during name resolution (before type checking and optimization). This expansion creates and expands a built-in view to compute the changes in the stream, and it resolves the micro partitions that the plan needs to scan.

Expanding a built-in view during name resolution may be used in connection with streams that only compute changes in base tables and simple select/project views. In this case, the expansion may be performed similarly to expanding a regular built-in view. However, when the query is more complicated, the entire view may need to be rewritten. Doing this during name resolution may present challenges that may be addressed based on refactoring stream expansion and moving change query rewrites into the optimizer.

In some embodiments and in connection with providing a compiler overview, the compiler phases used by the join views manager 230 can include:

(a) Parsing (SqlParser): turns query text into the parse tree representing query syntax.

(b) Typechecking (SqlTypechecker): Name resolution (SqlObjectNameResolver::resolve): resolves names in the parse tree into dictionary entities, checking permissions, and expanding views. Type resolution (SqlTypechecker::typeResolution): infers types of expressions, raising type errors upon encountering contradictions. Validation (SqlValidator::validityCheck): ensures the parse tree conforms to constraints other than type checking, such as which operations are supported by MVs or change queries. Parse tree optimizations (SqlTypechecker::optimizeTypecheckStatement): does an initial battery of rewrites on the parse tree, including expression rewrites (which rewrite scalar expressions in simpler terms), and early rounds of constant folding, filter pushdown, and pruning.

(c) Query planning (QueryPlanner::generateQueryPlan): Parse tree translation (SqlQueryBlockTranslator): translate SQL syntactic constructs into a uniform representation of operators accepting inputs and producing outputs. For example, a SELECT expression is split into nodes for scanning, selection, projection, joining, and aggregation. Plan optimization (QueryPlanRewriter): does a more comprehensive set of rewrites on the query plan, including more constant folding, filter pushdown, pruning, aggregation pushdown, and cost-based optimization.

(d) Code generation (CodeGenerator::generateSDL): takes the optimized query plan and produces an SDL program for XP to execute.

In some embodiments associated with stream expansion refactoring, moving stream expansion into the query plan optimizer may provide the following processing efficiencies:

(a) Simpler representation. The parse tree directly represents SQL constructs in a class called SqlQueryBlock. The query plan represents the same logic more uniformly, in terms of operators with inputs and outputs. Rewrites are easier to implement on the query plan because of that uniformity.

(b) Code reuse. The plan rewrites rule framework may be used to implement many optimizer rewriting rules.

(c) Flexibility. Rewriting in the optimizer may provide control over the order in which the rewrites are invoked, which allows for improved integration with existing optimizations like filter pushdown, pruning, and join permutation.

For the refactoring, the following configurations may be provided for the join views manager 230:

(a) In name resolution, rewrite a stream into a view with a CHANGES clause (may be called the change view). The changing view is created by: selecting all columns from the source, and defines the change-metadata columns (ROW_ID, ACTION, ISUPDATE) as system functions to resolve later; and read from the stream's source. Create the change view's object ref based on: setting the view query block change view; setting the AT and END times to the stream's offset and advance frontiers; and setting the CHANGES clause to the stream type. The stream state may be put into the DmlTargetCollector.

(b) During validation, only supported operations may be allowed inside the change view.

(c) During parse tree optimizations, optimizations may be prevented from doing rewrites incompatible with the change view. For example, a filter containing a constant subquery may not be pushed down into the change view. Also, column expressions with change-metadata columns may not be moved from the query block with the CHANGES clause. The change view can be identified by the presence of the CHANGES clause in the SqlObjectRef.

(d) During parse tree translation, the change view may be transformed to have an additional QueryPlanNode that indicates that the subtree beneath it should be rewritten as a change query. A new class, QueryPlanNodeChanges, may be created, which contains the change type and frontiers to resolve. The change type can be MIN_DELTA, APPEND_ONLY, and INSERT_ONLY, with an additional internal type NON_MIN_DELTA, which can produce an INSERT and DELETE for the same row. The column expressions containing change-metadata system functions may be moved from the query block into the plan node, which adds these columns to its output row vector.

(e) During plan optimization, incompatible rewrites may be prevented from corrupting the change view.

In some embodiments associated with View Evolution/AT(Stream=> . . . ), when a view changes, or when a Stream is used in an AT clause, the set of tables in the current state may not match the set of tables being requested. In these cases, a table offset for the new tables may be selected. To solve this issue, a transactional timestamp may be stored in the frontier each time the stream advances. Then, new tables can use the most recent version older than that timestamp. Additionally, for Streams created as show_initial_rows=true, the state may be remembered and initial rows may be included for new tables added by view evolution.

In some embodiments associated with change rewrites, the join views manager 230 is configured to perform change rewrites to push the QueryPlanNodeChanges node down through the plan tree until there are no more Changes nodes in the tree. The join views manager 230 may be configured to rewrite queries that request changes to queries that compute the changes. The algorithm proceeds by applying rewrite rules that pattern match to the plan beneath the Changes node, as shown in FIG. 12.

Figure 12:
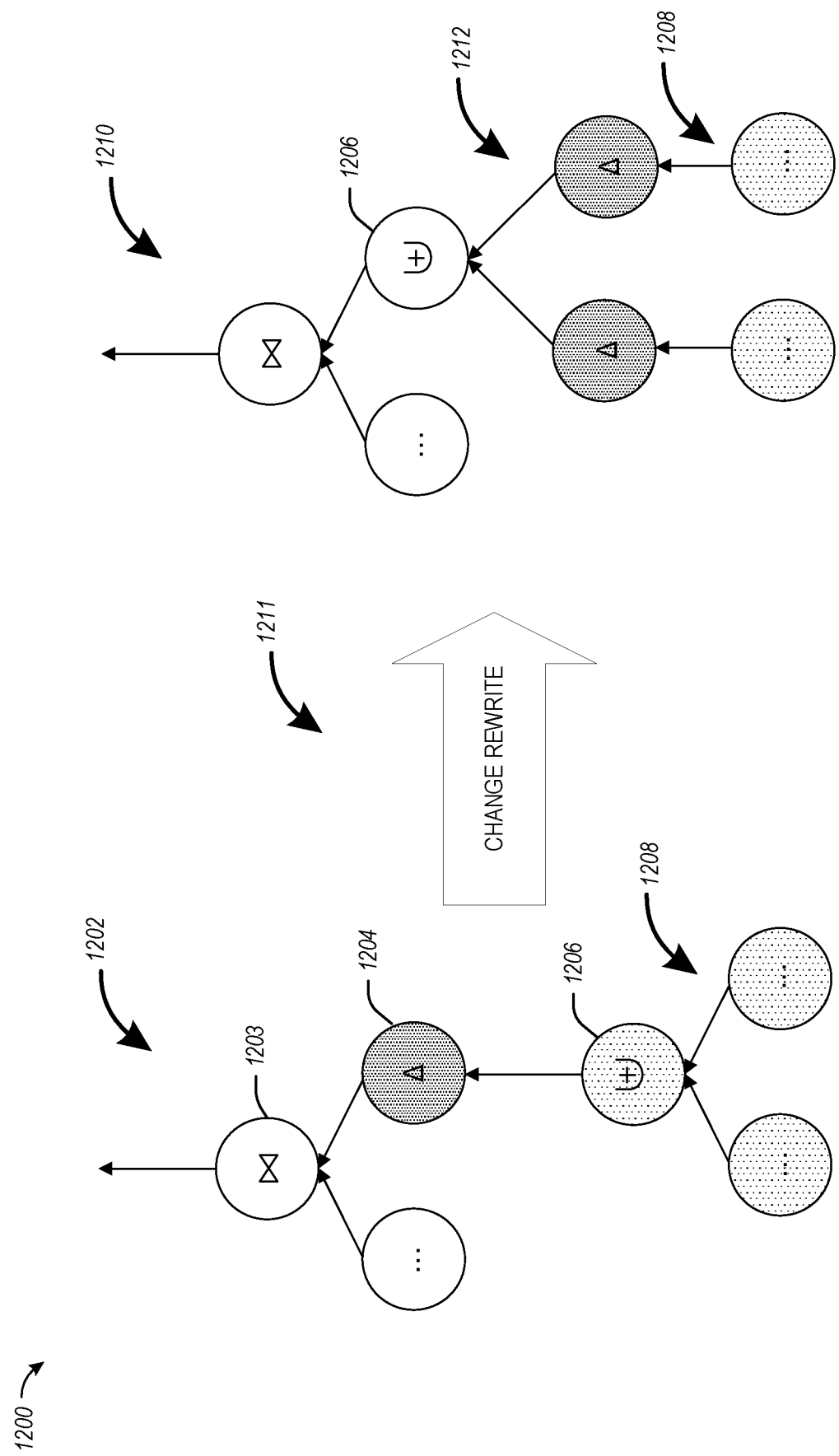
FIG. 12 is a diagram of a change rewrite in connection with a union all query, in accordance with some embodiments of the present disclosure.

FIG. 12 illustrates a diagram 1200 of a change rewrite in connection with a union all query, in accordance with some embodiments of the present disclosure. Referring to FIG. 12, query 1202 is transformed into query 1210 via a change rewrite operation 1211. Node 1203 represents a join of two sub-queries, where one of the sub-queries is represented by the changes node 1204. The changes node 1204 is associated with a union all node 1206 for sub-queries 1208.

During the change rewrite operation 1211, all nodes/operations below the changes node 1204 may be rewritten to produce changes. More specifically, the transformed query 1210 includes the union all node 1206 moved up, and the changes node 1204 is now duplicated as changes nodes 1212 into the branches for sub-queries 1208.

In some embodiments, the join views manager 230 may be configured with the following rewrite rules.

(a) Quick overview of the notation: $\Delta$ represents a Changes node. $\Delta$min, $\Delta$app, $\Delta$ins, and $\Delta$non specify the change type. $\sigma+$ and $\sigma-$ are operators that select insertions and deletions. T+ and T− are modified scan nodes that produce rows that may have been inserted or deleted during the change interval. $\pi\mu$ is a projection that adds change-metadata columns.

(b) If the change type is MIN_DELTA, a full outer join is produced to eliminate rows that were both inserted and deleted, with a NON_MIN_DELTA node below. $\Delta$min (Q)—$\xi(\Delta$nonQ), where $\xi$ is a table function that consolidates redundant deltas and determines whether a change is an update. This consolidation can be optimized away in some cases when all base tables have only had insertions.

(c) If the change node is directly above a scan, then the rewrite is similar to a stream expansion. Code in MetaPhysicalCache may be reused to generate scans with the correct pruning information. When the change type is NON_MIN_DELTA, a multiset of rows is produced that may have been inserted or deleted from the base table during the change time interval. This may include rows that cancel out. For example, $\Delta$non(T)$\Rightarrow\pi\mu$(T+$\uplus$T−).

When the change type is APPEND_ONLY, the multiset of rows that were inserted during the change time interval may be produced. For example, $\Delta$app(T)$\Rightarrow\sigma+(\pi\mu$(T+)).

When the change type is INSERT_ONLY, a multiset of rows that may have been inserted from the base table during the change time interval may be produced. In some aspects, this mode is intended for external tables. For example, $\Delta$ins(T)$\Rightarrow\pi\mu$(T+).

(d) If the change node is above a selection with no subqueries in the column list, the operators are commuted. For example, $\Delta(\sigma\varphi(Q))\Rightarrow\sigma\varphi(\Delta(Q))$.

(e) If the change node is above a projection with no subqueries in the column list, the operators are commuted after adding the change-metadata columns: $\Delta(\pi C(Q))\Rightarrow\pi C\times\mu(\Delta(Q))$.

(f) If the change node is above a union all, the change node is distributed among the branches: $\Delta(Q \uplus \ldots \uplus R)\Rightarrow\Delta Q \uplus \ldots \uplus \Delta R$.

(g) If the change node is above an inner join, join distributivity is applied to push it down as provided in Table 6 below.

TABLE 6

$\Delta(Q \bowtie R) =$
$(Q0 \uplus \Delta Q) \bowtie (R0 \uplus \Delta R) - Q0 \bowtie R0 =$
$(Q0 \bowtie R0) - (Q0 \bowtie R0) \uplus (\Delta Q \bowtie R0) \uplus$
$(Q0 \bowtie \Delta R) \uplus (\Delta Q \bowtie \Delta R) \Rightarrow$
$(\Delta Q \bowtie R0) \uplus (Q \bowtie \Delta R)$, where Q0 and R0 are Q and R at the start of the change time interval.

(h) Otherwise, the change query may not be rewritten and produce an error. The logic to add change-metadata columns to plan node column lists, which is vaguely hand-waved above using the $\pi\mu$ operator, is as follows:

(h.1) The change node conceptually includes a projection that adds the change metadata columns to its output column list.

(h.2) It keeps a list of the change-metadata columns that are required by operations above it in the query plan. When first created, these are the standard user-visible change-metadata columns: ACTION, ISUPDATE, and ROW_ID.

(h.3) Whenever the change node is pushed down through an operator, its change-metadata columns are added to that operator's column list, defined in different ways depending on the rewrite. The MIN_DELTA rewrite defines ISUPDATE in using the row-comparison in the full-outer join and removes it from the change node's set of change-metadata columns. Join rewrites define ROW_ID by combining the ROW IDs of the two branches that joined. The combining function may be commutative (e.g., addition) for join-reordering optimizations to preserve IDs. To deal with tables that are joined or unioned with themselves, a salt may be inserted on the row-id computation for tables that occur more than once in a plan.

Join rewrites define ACTION as the product of the multiplicities they represent: INSERT=1, DELETE=−1. In this regard, two inserts remain to insert, one of each becomes delete, two deletes become insert.

Table scans may define visible change-metadata columns in terms of physical change-tracking columns. Other operators may pass through ACTION and ROW_ID transparently.

(i) In some embodiments, rewrite rules may be implemented for other operators, which may fit into the structure disclosed herein. In some embodiments, streams on materialized views may be supported for such use cases.

In aspect associated with consolidating redundant changes, in existing streams, redundant changes may be eliminated using a full outer join on the row ID to find inserts and deletes that cancel out. However, when there is more than one insert or more than one delete for a row ID, this computes an incorrect delta. For example, consider what happens if we insert a 0, then increment that by 1. The changes to the table can be represented as: {+0, −0, +1}. This delta can be consolidated into {+1}. If a full-outer join is used that pairs up inserts and deletes, the result is {(+1, −0)}—{+1, −0}, where the first element is filtered out because it is unchanged. Since this processing is not correct, for streams on tables and streams on row-wise views, a single row may be considered to not have more than one insert or more than one delete. But for streams on joins, this type of processing may no longer hold and can be different.

Figure 13:
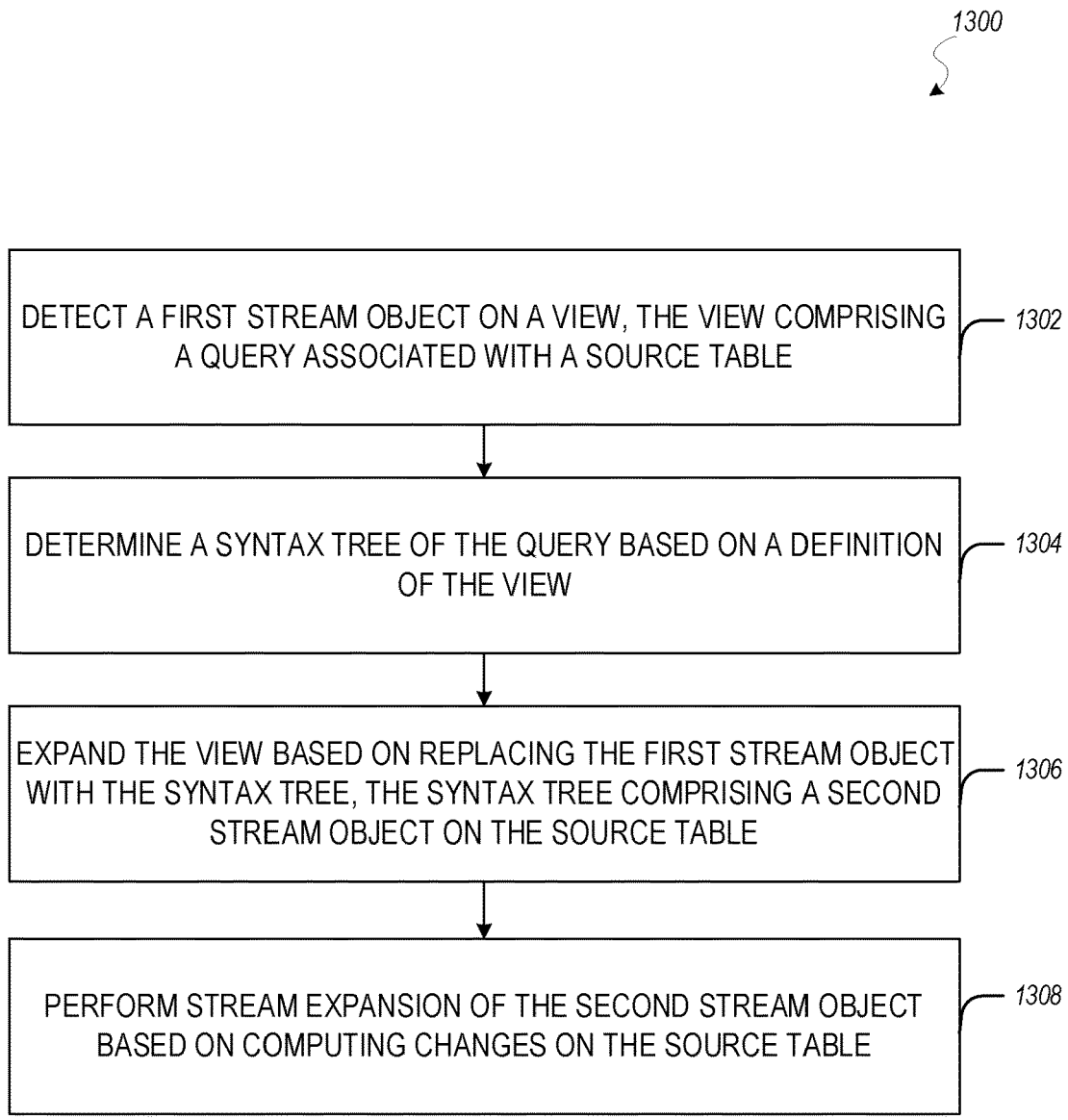
FIG. 13 is a flow diagram illustrating operations of a database system in performing a method for processing a stream object on a view, in accordance with some embodiments of the present disclosure.

FIG. 13 is a flow diagram illustrating operations of a database system in performing a method 1300 for processing a stream object on a view, in accordance with some embodiments of the present disclosure. Method 1300 may be embodied in computer-readable instructions for execution by one or more hardware components (e.g., one or more processors) such that the operations of the method 1300 may be performed by components of network-based database system 102, such as components of the compute service manager 108 (e.g., the streams manager 128) and/or the execution platform 110 (e.g., which may be implemented as machine 1400 of FIG. 14). Accordingly, method 1300 is described below, by way of example with reference thereto. However, it shall be appreciated that method 1300 may be deployed on various other hardware configurations and is not intended to be limited to deployment within the network-based database system 102.

At operation 1302, a first stream object is detected on a view, where the view may include a query associated with a source table. For example and about FIG. 10, the streams manager 128 detects a stream object 1004 on a view 1005. At operation 1304, a syntax tree of the query is determined based on a definition of the view (e.g., based on the project-filter-table scan operations associated with the view 1005).

At operation 1306, the view is expanded based on replacing the first stream object with the syntax tree, the syntax tree comprising a second stream object on the source table. For example, the view expansion operation 1003 is performed by replacing stream object 1004 with the syntax tree of view 1005. The syntax tree of view 1005 includes a second stream object (e.g., 1016) on the source table T.

At operation 1308, stream expansion of the second stream object is performed based on computing changes on the source table. For example, a stream expansion operation 1007 is performed based on computing the changes on the source table T (e.g., based on applying the join operation 1018).

Figure 14:
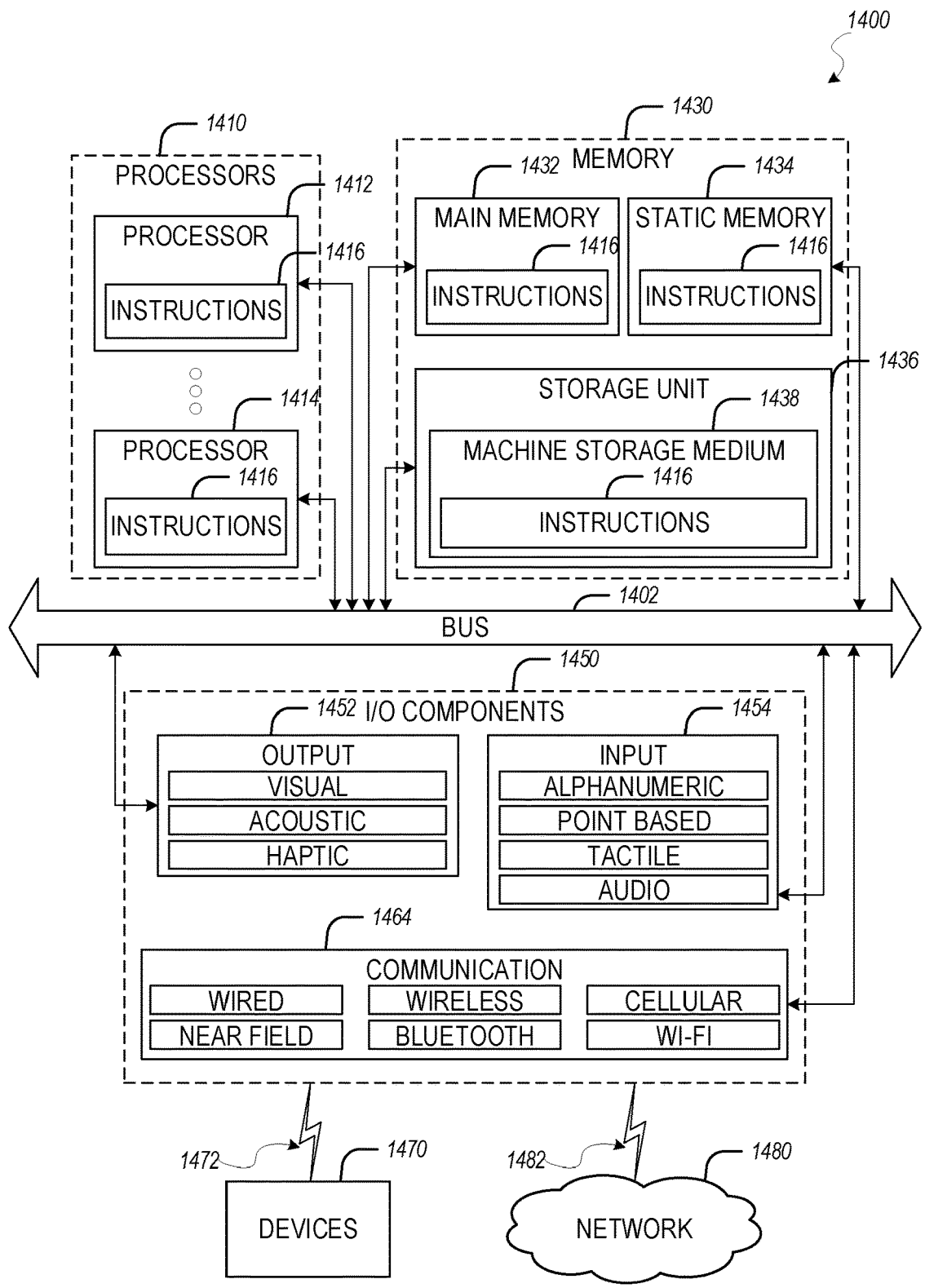
FIG. 14 illustrates a diagrammatic representation of a machine in the form of a computer system within which a set of instructions may be executed for causing the machine to perform any one or more of the methodologies discussed herein, in accordance with some embodiments of the present disclosure.

FIG. 14 illustrates a diagrammatic representation of a machine 1400 in the form of a computer system within which a set of instructions may be executed for causing the machine 1400 to perform any one or more of the methodologies discussed herein, according to an example embodiment. Specifically, FIG. 14 shows a diagrammatic representation of the machine 1400 in the example form of a computer system, within which instructions 1416 (e.g., software, a program, an application, an applet, an app, or other executable code) for causing the machine 1400 to perform any one or more of the methodologies discussed herein may be executed. For example, instructions 1416 may cause machine 1400 to execute any one or more operations of method 1300 (or any other technique discussed herein, for example in connection with FIG. 4-FIG. 13). As another example, instructions 1416 may cause machine 1400 to implement one or more portions of the functionalities discussed herein. In this way, instructions 1416 may transform a general, non-programmed machine into a particular machine 1400 (e.g., the compute service manager 108 or a node in the execution platform 110) that is specially configured to carry out any one of the described and illustrated functions in the manner described herein. In yet another embodiment, instructions 1416 may configure the compute service manager 108 and/or a node in the execution platform 110 to carry out any one of the described and illustrated functions in the manner described herein.

In alternative embodiments, the machine 1400 operates as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a smartphone, a mobile device, a network router, a network switch, a network bridge, or any machine capable of executing the instructions 1416, sequentially or otherwise, that specify actions to be taken by the machine 1400. Further, while only a single machine 1400 is illustrated, the term "machine" shall also be taken to include a collection of machines 1400 that individually or jointly execute the instructions 1416 to perform any one or more of the methodologies discussed herein.

Machine 1400 includes processors 1410, memory 1430, and input/output (I/O) components 1450 configured to communicate with each other such as via a bus 1402. In some example embodiments, the processors 1410 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1412 and a processor 1414 that may execute the instructions 1416. The term "processor" is intended to include multi-core processors 1410 that may comprise two or more independent processors (sometimes referred to as "cores") that may execute instructions 1416 contemporaneously. Although FIG. 14 shows multiple processors 1410, the machine 1400 may include a single processor with a single core, a single processor with multiple cores (e.g., a multi-core processor), multiple processors with a single core, multiple processors with multiple cores, or any combination thereof.

The memory 1430 may include a main memory 1432, a static memory 1434, and a storage unit 1436, all accessible to the processors 1410 such as via the bus 1402. The main memory 1432, the static memory 1434, and the storage unit 1436 store the instructions 1416 embodying any one or more of the methodologies or functions described herein. The instructions 1416 may also reside, completely or partially, within the main memory 1432, within the static memory 1434, within machine storage medium 1438 of the storage unit 1436, within at least one of the processors 1410 (e.g., within the processor's cache memory), or any suitable combination thereof, during execution thereof by the machine 1400.

The I/O components 1450 include components to receive input, provide output, produce output, transmit information, exchange information, capture measurements, and so on. The specific I/O components 1450 that are included in a particular machine 1400 will depend on the type of machine. For example, portable machines such as mobile phones will likely include a touch input device or other such input mechanisms, while a headless server machine will likely not include such a touch input device. It will be appreciated that the I/O components 1450 may include many other components that are not shown in FIG. 14. The I/O components 1450 are grouped according to functionality merely for simplifying the following discussion and the grouping is in no way limiting. In various example embodiments, the I/O components 1450 may include output components 1452 and input components 1454. The output components 1452 may include visual components (e.g., a display such as a plasma display panel (PDP), a light-emitting diode (LED) display, a liquid crystal display (LCD), a projector, or a cathode ray tube (CRT)), acoustic components (e.g., speakers), other signal generators, and so forth. The input components 1454 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures or other tactile input components), audio input components (e.g., a microphone), and the like.

Communication may be implemented using a wide variety of technologies. The I/O components 1450 may include communication components 1464 operable to couple the machine 1400 to a network 1480 or devices 1470 via a coupling 1482 and a coupling 1472, respectively. For example, the communication components 1464 may include a network interface component or another suitable device to interface with the network 1480. In further examples, the communication components 1464 may include wired communication components, wireless communication components, cellular communication components, and other communication components to provide communication via other modalities. The device 1470 may be another machine or any of a wide variety of peripheral devices (e.g., a peripheral device coupled via a universal serial bus (USB)). For example, as noted above, machine 1400 may correspond to any one of the compute service manager 108 or the execution platform 110, and the devices 1470 may include the client device 114 or any other computing device described herein as being in communication with the network-based database system 102 or the cloud storage platform 104.

The various memories (e.g., 1430, 1432, 1434, and/or memory of the processor(s) 1410 and/or the storage unit 1436) may store one or more sets of instructions 1416 and data structures (e.g., software) embodying or utilized by any one or more of the methodologies or functions described herein. These instructions 1416, when executed by the processor(s) 1410, cause various operations to implement the disclosed embodiments.

As used herein, the terms "machine-storage medium," "device-storage medium," and "computer-storage medium" mean the same thing and may be used interchangeably in this disclosure. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1480 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1480 or a portion of the network 1480 may include a wireless or cellular network, and the coupling 1482 may be a Code Division Multiple Access (CDMA) connection, a Global System for Mobile communications (GSM) connection, or another type of cellular or wireless coupling. In this example, the coupling 1482 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth-generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1416 may be transmitted or received over the network 1480 using a transmission medium via a network interface device (e.g., a network interface component included in the communication components 1464) and utilizing any one of several well-known transfer protocols (e.g., hypertext transfer protocol (HTTP)). Similarly, instructions

1416 may be transmitted or received using a transmission medium via the coupling 1472 (e.g., a peer-to-peer coupling) to the device 1470. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1416 for execution by the machine 1400, and include digital or analog communications signals or other intangible media to facilitate communication of such software. Hence, the terms "transmission medium" and "signal medium" shall be taken to include any form of a modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of method 1300 may be performed by one or more processors. The performance of certain of the operations may be distributed among the one or more processors, not only residing within a single machine but also deployed across several machines. In some example embodiments, the processor or processors may be located in a single location (e.g., within a home environment, an office environment, or a server farm), while in other embodiments the processors may be distributed across several locations.

Described implementations of the subject matter can include one or more features, alone or in combination as illustrated below by way of examples.

Example 1 is a system comprising: at least one hardware processor; and at least one memory storing instructions that cause the at least one hardware processor to perform operations comprising: detecting a first stream object on a view, the view comprising a query associated with a source table; determining a syntax tree of the query based on a definition of the view; expanding the view based on replacing the first stream object with the syntax tree, the syntax tree comprising a second stream object on the source table; and performing stream expansion of the second stream object based on computing changes on the source table.

In Example 2, the subject matter of Example 1 includes subject matter where during performing the stream expansion, the instructions further cause the at least one hardware processor to perform operations comprising: converting the second stream object on the source table into a second query; and performing the second query to compute the changes on the source table.

In Example 3, the subject matter of Example 2 includes subject matter where during performing the second query, the instructions further cause the at least one hardware processor to perform operations comprising: determining added and deleted micro-partitions in the source table.

In Example 4, the subject matter of Example 3 includes subject matter where during performing the second query, the instructions further cause the at least one hardware processor to perform operations comprising: joining rows from the added and deleted micro-partitions to compute the changes in the source table.

In Example 5, the subject matter of Examples 1–4 includes subject matter where the query is associated with a plurality of source tables, the plurality of source tables comprising the source table, and at least a second source table.

In Example 6, the subject matter of Example 5 includes subject matter where the instructions further cause the at least one hardware processor to perform operations comprising: expanding the view based on replacing the first stream object on the view with the syntax tree, the syntax tree comprising the second stream object on the source table and at least a third stream object on the at least a second source table.

In Example 7, the subject matter of Example 6 includes subject matter where the instructions further cause the at least one hardware processor to perform operations comprising: converting the second stream object on the source table into a second query; and converting the third stream object on the at least a second source table into a third query.

In Example 8, the subject matter of Example 7 includes subject matter where the instructions further cause the at least one hardware processor to perform operations comprising: performing the stream expansion of the second stream object based on performing the second query to compute the changes on the source table; and performing stream expansion of the third stream object based on performing the third query to compute changes on the at least a second source table.

In Example 9, the subject matter of Example 8 includes subject matter where the syntax tree comprises a join operation between the second stream object and the at least a third stream object, and wherein the instructions further cause the at least one hardware processor to perform operations comprising: replacing the join operation associated with the expanding of the view with a union of two join operations associated with the stream expansion of the second stream object and the stream expansion of the third stream object.

In Example 10, the subject matter of Examples 8–9 includes subject matter where the second query or the third query comprises a change node requesting a change operation, and the instructions further cause the at least one hardware processor to perform operations comprising: during the stream expansion of the second stream object or the stream expansion of the third stream object: rewriting the second query or the third query to compute changes associated with the change operation.

Example 11 is a method comprising: detecting a first stream object on a view, the view comprising a query associated with a source table; determining a syntax tree of the query based on a definition of the view; expanding the view based on replacing the first stream object with the syntax tree, the syntax tree comprising a second stream object on the source table; and performing stream expansion of the second stream object based on computing changes on the source table.

In Example 12, the subject matter of Example 11 includes subject matter where performing the stream expansion further comprises: converting the second stream object on the source table into a second query; and performing the second query to compute the changes on the source table.

In Example 13, the subject matter of Example 12 includes subject matter where performing the second query further comprises: determining added and deleted micro-partitions in the source table.

In Example 14, the subject matter of Example 13 includes subject matter where performing the second query further comprises: joining rows from the added and deleted micro-partitions to compute the changes in the source table.

In Example 15, the subject matter of Examples 11-14 includes subject matter where the query is associated with a plurality of source tables, the plurality of source tables comprising the source table, and at least a second source table.

In Example 16, the subject matter of Example 15 includes, expanding the view based on replacing the first stream object on the view with the syntax tree, the syntax tree comprising the second stream object on the source table, and at least a third stream object on the at least a second source table.

In Example 17, the subject matter of Example 16 includes, converting the second stream object on the source table into a second query; and converting the third stream object on the at least a second source table into a third query.

In Example 18, the subject matter of Example 17 includes, performing the stream expansion of the second stream object based on performing the second query to compute the changes on the source table; and performing stream expansion of the third stream object based on performing the third query to compute changes on the at least a second source table.

In Example 19, the subject matter of Example 18 includes subject matter where the syntax tree comprises a join operation between the second stream object and the at least a third stream object, and wherein the method further comprises: replacing the join operation associated with the expanding of the view with a union of two join operations associated with the stream expansion of the second stream object and the stream expansion of the third stream object.

In Example 20, the subject matter of Examples 18-19 includes subject matter where the second query or the third query comprises a change node requesting a change operation, and wherein the method further comprises: during the stream expansion of the second stream object or the stream expansion of the third stream object: rewriting the second query or the third query to compute changes associated with the change operation.

Example 21 is a computer-storage medium comprising instructions that, when executed by one or more processors of a machine, configure the machine to perform operations comprising: detecting a first stream object on a view, the view comprising a query associated with a source table; determining a syntax tree of the query based on a definition of the view; expanding the view based on replacing the first stream object with the syntax tree, the syntax tree comprising a second stream object on the source table; and performing stream expansion of the second stream object based on computing changes on the source table.

In Example 22, the subject matter of Example 21 includes subject matter where the operations for performing the stream expansion further comprise: converting the second stream object on the source table into a second query; and performing the second query to compute the changes on the source table.

In Example 23, the subject matter of Example 22 includes subject matter where the operations for performing the second query further comprise: determining added and deleted micro-partitions in the source table.

In Example 24, the subject matter of Example 23 includes subject matter where the operations for performing the second query further comprise: joining rows from the added and deleted micro-partitions to compute the changes in the source table.

In Example 25, the subject matter of Examples 21-24 includes subject matter where the query is associated with a plurality of source tables, the plurality of source tables comprising the source table, and at least a second source table.

In Example 26, the subject matter of Example 25 includes, the operations further comprising: expanding the view based on replacing the first stream object on the view with the syntax tree, the syntax tree comprising the second stream object on the source table, and at least a third stream object on the at least a second source table.

In Example 27, the subject matter of Example 26 includes, the operations further comprising: converting the second stream object on the source table into a second query; and converting the third stream object on the at least a second source table into a third query.

In Example 28, the subject matter of Example 27 includes, the operations further comprising: performing the stream expansion of the second stream object based on performing the second query to compute the changes on the source table; and performing stream expansion of the third stream object based on performing the third query to compute changes on the at least a second source table.

In Example 29, the subject matter of Example 28 includes subject matter where the syntax tree comprises a join operation between the second stream object and the at least a third stream object, and wherein the operations further comprise: replacing the join operation associated with the expanding of the view with a union of two join operations associated with the stream expansion of the second stream object and the stream expansion of the third stream object.

In Example 30, the subject matter of Examples 28-29 includes subject matter where the second query or the third query comprises a change node requesting a change operation, and wherein the operations further comprise: during the stream expansion of the second stream object or the stream expansion of the third stream object: rewriting the second query or the third query to compute changes associated with the change operation.

Example 31 is at least one machine-readable medium including instructions that, when executed by processing circuitry, cause the processing circuitry to perform operations to implement any of Examples 1-30.

Example 32 is an apparatus comprising means to implement any of Examples 1-30.

Example 33 is a system to implement any of Examples 1-30.

Example 34 is a method to implement any of Examples 1-30.

Although the embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   at least one hardware processor; and
   at least one memory storing instructions that cause the at least one hardware processor to perform operations comprising:
      detecting a first stream object on a view, the view comprising a query associated with a source table, the first stream object comprising a plurality of query results of executing the query and a corresponding plurality of time stamps associated with times the plurality of query results are obtained;
      determining a syntax tree of the query based on a definition of the view, the definition of the view comprising at least one database operation associated with the source table;
      expanding the view based on replacing the first stream object with the syntax tree, the syntax tree comprising a second stream object, the second stream object applied on the source table and the second stream object corresponding to the at least one database operation; and
      performing stream expansion of the second stream object based on computing changes on the source table.

2. The system of claim 1, wherein during performing the stream expansion, the instructions further cause the at least one hardware processor to perform operations comprising:
   converting the second stream object on the source table into a second query; and
   performing the second query to compute the changes on the source table.

3. The system of claim 2, wherein during performing the second query, the instructions further cause the at least one hardware processor to perform operations comprising:
   determining added and deleted micro-partitions in the source table.

4. The system of claim 3, wherein during performing the second query, the instructions further cause the at least one hardware processor to perform operations comprising:
   joining rows from the added and deleted micro-partitions to compute the changes in the source table.

5. The system of claim 1, wherein the query is associated with a plurality of source tables, the plurality of source tables comprising the source table and at least a second source table.

6. The system of claim 5, wherein the instructions further cause the at least one hardware processor to perform operations comprising:
   expanding the view based on replacing the first stream object on the view with the syntax tree, the syntax tree comprising the second stream object on the source table and at least a third stream object on the at least a second source table.

7. The system of claim 6, wherein the instructions further cause the at least one hardware processor to perform operations comprising:
   converting the second stream object on the source table into a second query; and
   converting the third stream object on the at least a second source table into a third query.

8. The system of claim 7, wherein the instructions further cause the at least one hardware processor to perform operations comprising:
   performing the stream expansion of the second stream object based on performing the second query to compute the changes on the source table; and
   performing stream expansion of the third stream object based on performing the third query to compute changes on the at least a second source table.

9. The system of claim 8, wherein the syntax tree comprises a join operation between the second stream object and the at least a third stream object, and wherein the instructions further cause the at least one hardware processor to perform operations comprising:
   replacing the join operation associated with the expanding of the view with a union of two join operations associated with the stream expansion of the second stream object and the stream expansion of the third stream object.

10. The system of claim 8, wherein the second query or the third query comprises a change node requesting a change operation, and the instructions further cause the at least one hardware processor to perform operations comprising:
    during the stream expansion of the second stream object or the stream expansion of the third stream object:
    rewriting the second query or the third query to compute changes associated with the change operation.

11. A method comprising:
    detecting a first stream object on a view, the view comprising a query associated with a source table, the first stream object comprising a plurality of query results of executing the query and a corresponding plurality of time stamps associated with times the plurality of query results are obtained;
    determining a syntax tree of the query based on a definition of the view, the definition of the view comprising at least one database operation associated with the source table;

expanding the view based on replacing the first stream object with the syntax tree, the syntax tree comprising a second stream object, the second stream object applied on the source table and the second stream object corresponding to the at least one database operation on the source table; and performing stream expansion of the second stream object based on computing changes on the source table.

12. The method of claim 11, wherein performing the stream expansion further comprises:

converting the second stream object on the source table into a second query; and performing the second query to compute the changes on the source table.

13. The method of claim 12, wherein performing the second query further comprises:

determining added and deleted micro-partitions in the source table.

14. The method of claim 13, wherein performing the second query further comprises:

joining rows from the added and deleted micro-partitions to compute the changes in the source table.

15. The method of claim 11, wherein the query is associated with a plurality of source tables, the plurality of source tables comprising the source table and at least a second source table.

16. The method of claim 15, further comprising:

expanding the view based on replacing the first stream object on the view with the syntax tree, the syntax tree comprising the second stream object on the source table and at least a third stream object on the at least a second source table.

17. The method of claim 16, further comprising:

converting the second stream object on the source table into a second query; and converting the third stream object on the at least a second source table into a third query.

18. The method of claim 17, further comprising:

performing the stream expansion of the second stream object based on performing the second query to compute the changes on the source table; and performing stream expansion of the third stream object based on performing the third query to compute changes on the at least a second source table.

19. The method of claim 18, wherein the syntax tree comprises a join operation between the second stream object and the at least a third stream object, and wherein the method further comprises:

replacing the join operation associated with the expanding of the view with a union of two join operations associated with the stream expansion of the second stream object and the stream expansion of the third stream object.

20. The method of claim 18, wherein the second query or the third query comprises a change node requesting a change operation, and wherein the method further comprises:

during the stream expansion of the second stream object or the stream expansion of the third stream object:

rewriting the second query or the third query to compute changes associated with the change operation.

21. A computer-storage medium comprising instructions that, when executed by one or more processors of a machine, configure the machine to perform operations comprising:

detecting a first stream object on a view, the view comprising a query associated with a source table, the first stream object comprising a plurality of query results of executing the query and a corresponding plurality of time stamps associated with times the plurality of query results are obtained;

determining a syntax tree of the query based on a definition of the view, the definition of the view comprising at least one database operation associated with the source table;

expanding the view based on replacing the first stream object with the syntax tree, the syntax tree comprising a second stream object, the second stream object applied on the source table and the second stream object corresponding to the at least one database operation on the source table; and performing stream expansion of the second stream object based on computing changes on the source table.

22. The computer-storage medium of claim 21, wherein the operations for performing the stream expansion further comprise:

converting the second stream object on the source table into a second query; and performing the second query to compute the changes on the source table.

23. The computer-storage medium of claim 22, wherein the operations for performing the second query further comprise:

determining added and deleted micro-partitions in the source table.

24. The computer-storage medium of claim 23, wherein the operations for performing the second query further comprise:

joining rows from the added and deleted micro-partitions to compute the changes in the source table.

25. The computer-storage medium of claim 21, wherein the query is associated with a plurality of source tables, the plurality of source tables comprising the source table and at least a second source table.

26. The computer-storage medium of claim 25, the operations further comprising:

expanding the view based on replacing the first stream object on the view with the syntax tree, the syntax tree comprising the second stream object on the source table and at least a third stream object on the at least a second source table.

27. The computer-storage medium of claim 26, the operations further comprising:

converting the second stream object on the source table into a second query; and converting the third stream object on the at least a second source table into a third query.

28. The computer-storage medium of claim 27, the operations further comprising:

performing the stream expansion of the second stream object based on performing the second query to compute the changes on the source table; and performing stream expansion of the third stream object based on performing the third query to compute changes on the at least a second source table.

29. The computer-storage medium of claim 28, wherein the syntax tree comprises a join operation between the second stream object and the at least a third stream object, and wherein the operations further comprise:

replacing the join operation associated with the expanding of the view with a union of two join operations associated with the stream expansion of the second stream object and the stream expansion of the third stream object.

30. The computer-storage medium of claim 28, wherein the second query or the third query comprises a change node requesting a change operation, and wherein the operations further comprise:
   during the stream expansion of the second stream object or the stream expansion of the third stream object:
   rewriting the second query or the third query to compute changes associated with the change operation.

* * * * *